United States Patent
Linton et al.

(10) Patent No.: US 9,672,579 B1
(45) Date of Patent: Jun. 6, 2017

(54) APPARATUS AND METHOD PROVIDING COMPUTER-IMPLEMENTED ENVIRONMENT FOR IMPROVED EDUCATOR EFFECTIVENESS

(71) Applicant: School Improvement Network, Midvale, UT (US)

(72) Inventors: Cory J. Linton, Draper, UT (US); Jonathan Smalley, Riverton, UT (US); Neil Jarman, West Jordan, UT (US); James Lyon, Lehi, UT (US); Justin Morris, South Jordan, UT (US); Matthew Donaldson, Midvale, UT (US); Jeremy P. Petersen, Draper, UT (US); Chet D. Linton, Sandy, UT (US)

(73) Assignee: School Improvement Network, LLC, Midvale, UT (US)

(*) Notice: Subject to any disclaimer, the term of this patent is extended or adjusted under 35 U.S.C. 154(b) by 682 days.

(21) Appl. No.: 13/840,764

(22) Filed: Mar. 15, 2013

(51) Int. Cl.
*G06Q 10/06* (2012.01)
*G06Q 50/20* (2012.01)
*G06F 21/44* (2013.01)

(52) U.S. Cl.
CPC .......... *G06Q 50/20* (2013.01); *G06F 21/44* (2013.01); *G06Q 10/06398* (2013.01)

(58) Field of Classification Search
CPC ..................................................... G06Q 10/06
USPC ........................................................ 705/7.42
See application file for complete search history.

(56) References Cited

U.S. PATENT DOCUMENTS

| | | |
|---|---|---|
| 4,375,080 A | 2/1983 | Barry et al. |
| 2003/0113698 A1* | 6/2003 | Von der Geest et al. ..... 434/322 |
| 2006/0147890 A1 | 7/2006 | Bradford et al. ............. 434/362 |
| 2006/0173731 A1 | 8/2006 | Scarpelli |
| 2008/0102428 A1 | 5/2008 | Levy et al. .................... 434/322 |
| 2010/0010880 A1 | 1/2010 | Toth et al. ....................... 705/11 |
| 2010/0145870 A1 | 6/2010 | Luster ............................ 705/321 |
| 2011/0065082 A1* | 3/2011 | Gal et al. ....................... 434/365 |
| 2012/0208168 A1 | 8/2012 | Atkinson et al. |
| 2012/0310696 A1 | 12/2012 | Toth ................................... 705/9 |
| 2013/0031208 A1 | 1/2013 | Linton et al. .................. 709/217 |
| 2013/0042007 A1 | 2/2013 | Linton et al. .................. 709/226 |
| 2013/0111363 A1* | 5/2013 | Linton ........................... 715/753 |
| 2014/0134590 A1* | 5/2014 | Hiscock Jr. .............. G09B 5/00 434/350 |

(Continued)

FOREIGN PATENT DOCUMENTS

WO   WO 2013/025428 A2   2/2013   ........... G06F 15/173

OTHER PUBLICATIONS

U.S. Appl. No. 61/724,426, filed Nov. 2012, Hiscock, Steven Richard.*

(Continued)

*Primary Examiner* — Kurtis Gills
(74) *Attorney, Agent, or Firm* — Sunstein Kann Murphy & Timbers LLP

(57) ABSTRACT

A method provides a computer-implemented environment for improved educator effectiveness. The method includes a server serving, receiving, and storing web pages over a wide area network connected to client computers of administrators or teachers of a school, so the administrators or teachers can create, use or view processes and observation workflows to conduct performance reviews of teachers in the school.

13 Claims, 30 Drawing Sheets

(56) References Cited

U.S. PATENT DOCUMENTS

2014/0172516 A1* 6/2014 Davison ................ 705/7.39
2014/0272908 A1* 9/2014 Black ..................... 434/362

OTHER PUBLICATIONS

Prince George's County Public Schools, Framework for Teaching Observation Process, (wwwl.pgcps.org/WorkArea/DownloadAsset.aspx?id=162902); 2012-1013.

* cited by examiner

APPARATUS AND METHOD PROVIDING COMPUTER-IMPLEMENTED ENVIRONMENT FOR IMPROVED EDUCATOR EFFECTIVENESS

TECHNICAL FIELD

The present invention relates to computer-implemented environments for school districts, educators, and students, and more particularly to an integrated environment for observing and facilitating teachers' effectiveness in the classroom and developing teachers' professional development.

BACKGROUND ART

It is known in the prior art to observe the performance of a teacher and provide the teacher with comments on the performance. Computer-implemented educational environments are also known in the prior art. Often such environments are focused on single aspects of the educational environment, such as evaluation procedures. Recently, procedures have been developed that recommend or require teachers and administrators to follow certain processes, and a sample page of an exemplary process is attached hereto as Exhibit A.

SUMMARY OF THE EMBODIMENTS

In a first embodiment of the invention there is provided a computer-implemented method of licensing a resource in a computer-implemented educational environment to a school administration entity. The method of this embodiment includes:

providing a first set of web pages, over a wide area network by a server to a client computer operated by a group administrator, that identify a set of resources available for license to the school administrate entity;

upon receiving, over the network from the group administrator's client computer, data characterizing a selection by the group administrator of a resource, providing by the server over the network to the group administrator's client computer, a second set of web pages that specify general licensing terms for the selected resource and that are configured to receive an input from the group administrator's client computer of specified licensing parameters;

upon receiving, over the network from the group administrator's client computer, data characterizing the specified licensing parameters, providing by the server a third set of web pages that summarize the specific license terms applicable to the specified licensing parameters and that are configured to receive an input from the group administrator's client computer of an access control list pertinent to the selected resource, approval of the specific license terms and arrangements for payment;

upon receiving, over the network from the group administrator's client computer, data characterizing the access control list, the group administrator's approval of the specific license terms and arrangements for payment, processing such data by the server to identify the school administration entity as licensed to the resource; and making the resource available over the network to individuals on the access control list.

In another embodiment, the invention provides a computer-implemented method of licensing a resource in a computer-implemented educational environment to a school administration entity. The method of this embodiment includes:

upon receiving, over a wide area network from a client computer of a group administrator for the school administration entity, following presentation to the group administrator of terms for a license to the resource, data characterizing (i) an acceptance of licensing terms for a resource that has been offered to the school administration entity and (ii) an access control list of individuals having access to the resource, adding the resource as available to individuals on the access control list by modifying permission governing use of the resource; and causing electronic notification of individuals on the access control list of the availability of the resource.

In another embodiment, the invention provides a computer-implemented method of providing a computer-implemented environment for improved educator effectiveness, and the method includes:

serving web pages, by the server over a wide area network to client computers of a set of administrators of a school entity body, by which the administrators can, in an administrative view, use a process template, having a first graphical user interface, to define processes that are to be performed by teachers in the school entity body and an observation template, having a second graphical user interface, to define workflows for observations of teachers in the school entity body, such observations conducted by a set of observers, wherein each of the administrators has rights in the administrative view to define processes and to define workflows for observations for at least a subset of the set of teachers;

receiving, by the server over the wide area network from the client computers of the set of administrators, data characterizing the processes and observation workflows defined by the set of administrators and storing such data in relation to the teachers and administrators to which the defined processes and observation workflows pertain;

serving web pages, by the server over the wide area network to client computers of teachers, by which each of the teachers, in a professional view, can view any of the defined processes and observation workflows, applicable to such teacher and can view results of any of the observations applicable to such teacher; and serving web pages, by the server over the wide area network to client computers of the set of administrators, by which each of the administrators can view any of the defined processes and observation workflows, and any results of any of the observations applicable to at least a subset of the teachers.

In a related embodiment, the method further includes serving web pages, by the server over the wide area network to client computers of the observers, wherein each observer may set forth distinct comments pertinent to such observer's observation of a given teacher; and receiving by the server over the wide area network from the client computers of the observers, data characterizing the comments and storing such data in relation to the teachers to which the comments pertain, so that each of the teachers, in the professional development module, can view any of the comments applicable to such teacher.

In a further related embodiment, the web pages by which each of the teachers can view results of any of the observations applicable to such teacher further include a designated region wherein such teacher can provide a feedback comment to such results, wherein such feedback comments are caused to be stored by the server and made available for viewing by at least one of the administrators.

Alternatively or in addition, the web pages, served to client computers of the observers wherein each observer may set forth distinct comments, include an area wherein such observer can suggest to such teacher a set of resources pertinent to such observer's comments and wherein the area is expressly designated therein as for identification of resources, so that a given teacher, in viewing a web page including a comment from an observation of the given teacher, will also be exposed to any suggestion by the corresponding observer of a set of resources.

A further related embodiment additionally includes: receiving, over the wide area network by the server from the client computers of the teachers and from the client computers of the observers, completion data for processes defined and observation workflows defined with respect to which such teachers and observers have played a role, and storing such completion data; and serving web pages, by the server over the wide area network to client computers of the set of administrators, by which each of the administrators can view the completion data applicable to at least a subset of the teachers.

Optionally, the web pages by which each of the administrators can view the completion data include web pages displaying the status of steps in one or more defined processes. Optionally, the web pages by which each of the administrators can view the completion data include web pages displaying the status of the defined observation workflows.

A related embodiment further includes serving web pages, by the server over the wide area network to client computers of the set of observers, by which each of the observers can view the completion data applicable to the defined observation workflows applicable to such observer. Optionally, the process template is configured to receive a graphical user input from the administrator that specifies items including a name for a process to be defined, a name for each step in the process to be defined, and, for each such step, a designation of the type of step from a listing of types of steps.

In another embodiment, the invention provides a computer-implemented method of providing a computer-implemented environment for improved educator effectiveness, and the method includes:

serving web pages, by a server over the wide area network to client computers of teachers of a school entity body, by which any given one of the teachers can view a professional development plan applicable to such teacher and can supply any of a plurality of types of evidence to document progress in carrying out the plan so as to produce evidence data that is transmitted to the server over the wide area network and wherein the given one of the teachers has a corresponding facilitator for the plan;

receiving at the server over the wide area network the evidence data and storing it in association with the professional development plan applicable to such teacher;

serving web pages by the server over the wide area network to client computers of facilitators of the professional development plans applicable to the teachers, such web pages including the professional development plans applicable to the teachers and the evidence data, so that the facilitator for the given one of the teachers can see and review the evidence data.

Optionally, the web pages served to client computers of the facilitators are configured so that a web page applicable to the given one of the teachers shows the plan and the evidence in a manner as to show progress of the given one of the teachers in carrying out the plan. Alternatively or in addition, the evidence data includes reflection questions associated with videos referenced in the professional developments plans as well as answers posted in response to the reflection questions. Alternatively or in addition, the web pages served to client computers of teachers configured so that a given one of the teachers can cause such teacher's professional development plan to be shared with an administrator; the method further comprising, when the given one of the teachers has caused the sharing of the plan with the administrator, automatically registering the administrator as a facilitator of the plan. Alternatively or in addition, (i) the web pages served to client computers of the facilitators are configured so that a facilitator can make a comment with respect to a folder of a professional development plan or an item of evidence that has been attached to the plan and such comment is transmitted to the server over the wide area network, the method further comprising storing such comment in association with the professional development plan applicable to such teacher; and (ii) the web pages served to a client computer of a teacher associated with the plan to which the facilitator's comment pertains are configured so that they show the comment after the comment has been stored by the server. Optionally, the web pages served to the client computer of the teacher associated with the plan to which the facilitator's comment pertains are further configured so that the teacher can provide a response to the comments, response being transmitted to the server and stored by the server, and wherein the web pages served to the client computer of the facilitator making the comment are configured so that a facilitator can see the response after it has been stored by the server.

In another embodiment, the invention provides a nontransitory digital storage medium encoded with instructions that, when loaded into a computer, establish processes that perform any of the previously recited methods. A distinct digital storage embodiment corresponds to each distinct method embodiment.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 1:
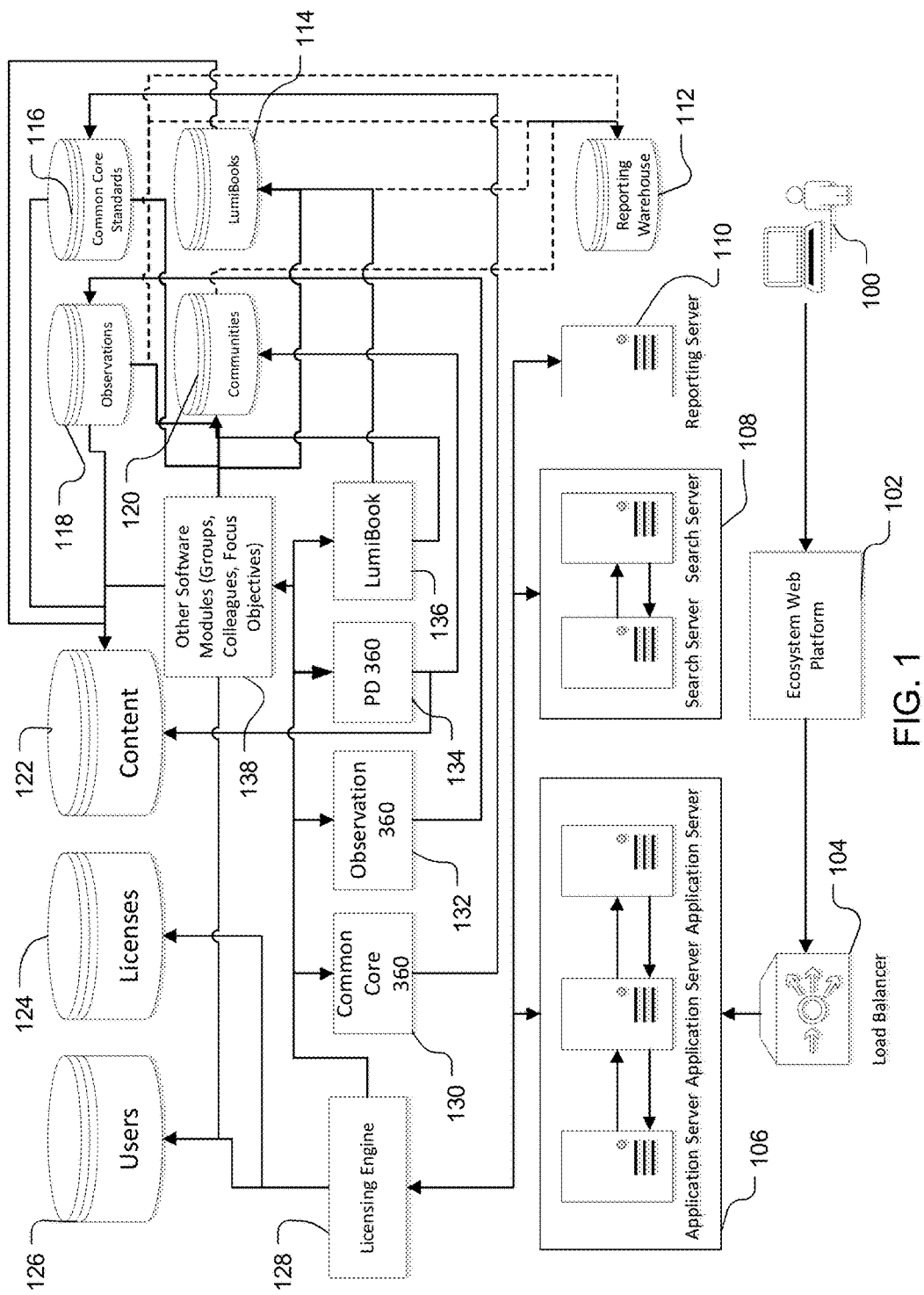
FIG. 1 is diagram of showing system architecture for a computer-implemented educational environment of the general type used by embodiments of the present invention.

As used in this description and the accompanying claims, the following terms shall have the meanings indicated, unless the context otherwise requires:

A "school administration entity" means any of a school district, a set of school districts sharing administrative functions, an individual school, and a set of individual schools sharing administrative functions.

A "school entity body" is a set of individuals who are stakeholders in the activities of a school administration entity, including administrators, teachers, students, parents of students, and other interest individuals.

A "group administrator" of a school administration entity is a member of a set of individuals having authority to act for the school administration entity in connection with licensing of software, educational content, and computer-implemented educational environments using such software and content.

An "application" means a computer program or a set of computer programs providing a functionality pertinent to education, wherein the program may be implemented in a server-client context so as to be in the form of Software as a Service (SaaS) or by other means including software that may run on an individual computer.

An item of educational "content" means any digitally storable item that presents information pertinent to education, including in the form of text, pictures, video, audio, or any combination of the foregoing.

An educational "resource" means any of an application, an item of educational content, or a combination of an application with a set of items of educational content.

A "licensing parameter" is an item of information governing implementation of a license. Example of licensing parameters include license seat count, license duration, price per seat, price per view of content, etc.

An "access control list" of a school administration entity with respect to resource is a listing, by the group administrator of the school administration entity, of those individuals in the corresponding school entity body who have access to the resource as well as an e-mail address, or a proxy for it, for each such individual. Optionally, the access control list can include other information for each such individual such as permission level with respect to the resource.

A "set" includes at least one member.

A "subset" is a proper subset and therefore includes some, but not all, members of a set and also includes at least one member.

A "process" is a set of tasks to be performed by teachers and other educators, established by an administrator, for administrative purposes of a school administration entity, including the observation and evaluation of teachers.

A teacher "observation" is a session in which the teacher is observed in teaching by an individual for administrative purposes of a school administration entity.

An "observer" is an individual who conducts an observation of a teacher.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

FIG. 1 is a diagram showing system architecture for a computer-implemented educational environment of the general type used by embodiments of the present invention. Client computers 100 access the educational ecosystem web platform 102 over the internet or other wide area network. The load placed on the system by the client computers 100 is balanced by load balancer 104, which is coupled to a server system implemented by a series of application servers 106 in a peer-to-peer configuration. Part of the server load is offloaded to a series of search servers 108 and a reporting server 110 for report generation, which in turn accesses reporting data warehouse 112. These servers are coupled to licensing engine 128, which determines resources that are available to any specific user accessing the platform from a client computer. The licensing engine accesses the license database 124 and the user database 126 to determine eligibility and makes available licensed resources to the client computers 100 of the users. These may include various applications, such as Common Core 360 (item 130), Observation 360 (item 132) for which observation data is stored in observation database 118, PD360 (item 134) and its associated content via database 122, and LumiBook (item 136). Additional databases store common core standards 116, forum and related data relating to communities 120, and LumiBooks 114.

Figure 2:
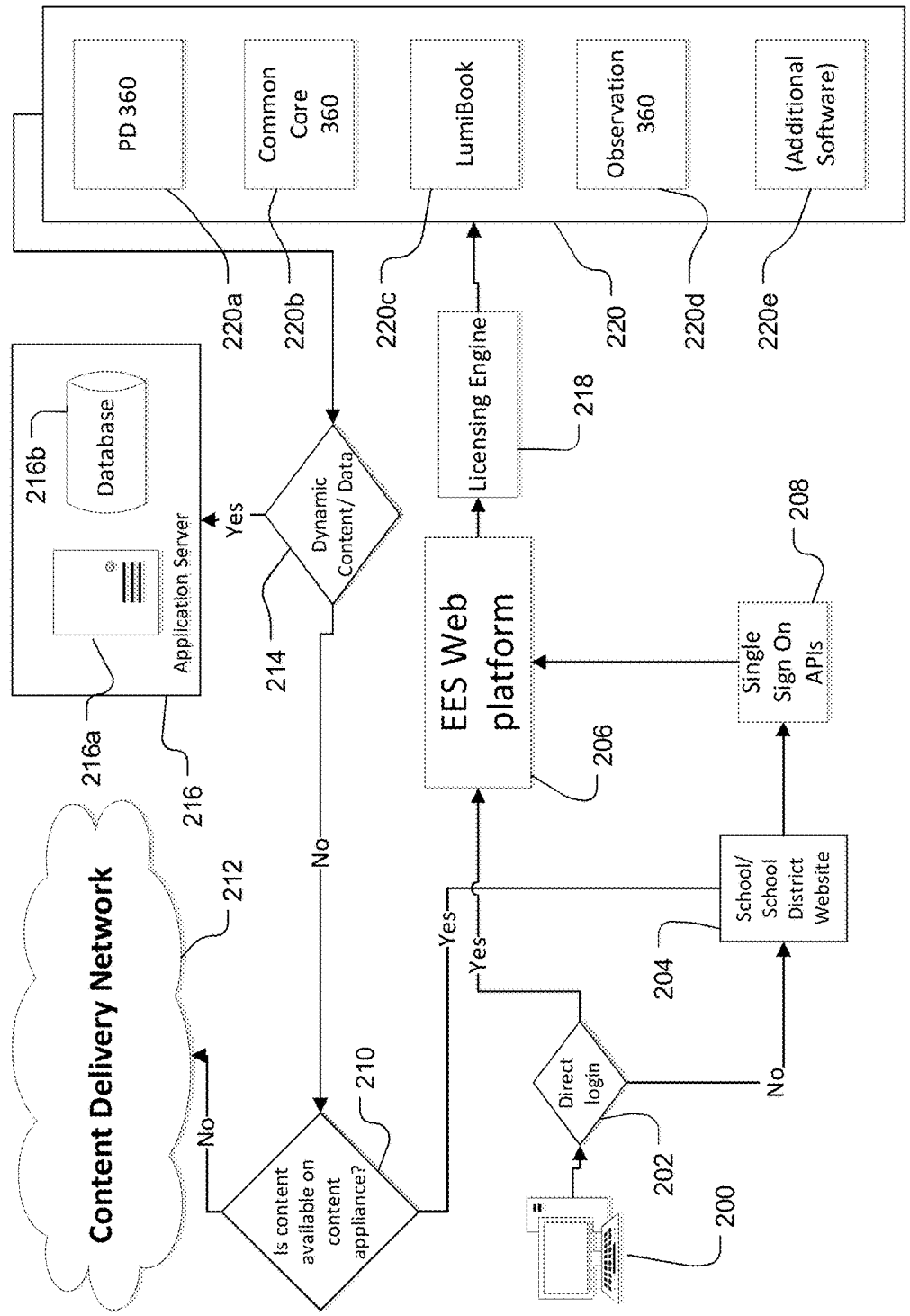
FIG. 2 is a block diagram showing logical flow associated with providing educational resources using the system architecture of FIG. 1.

FIG. 2 is a block diagram showing logical flow associated with providing educational resources using the system architecture of FIG. 1. The client computer 200 encounters the login screen in process 202, and if there is a successful login, process flow moves to the educational ecosystem platform at 206, otherwise the school or school district website is presented in process 204. From that website there is enabled a single sign-on application programming interface that provides another path 208 to the ecosystem platform 208. At that point the licensing engine 218 determines access to resources such as the applications PD360 (220a), Common Core 360 (220b), LumiBook (220c,) and Observation 360 (220d). The applications in turn access dynamic content and data via application server 216 and database 216b. Other content may be accessed from content delivery network 212 if it is not available locally the school or school district.

Figure 3:
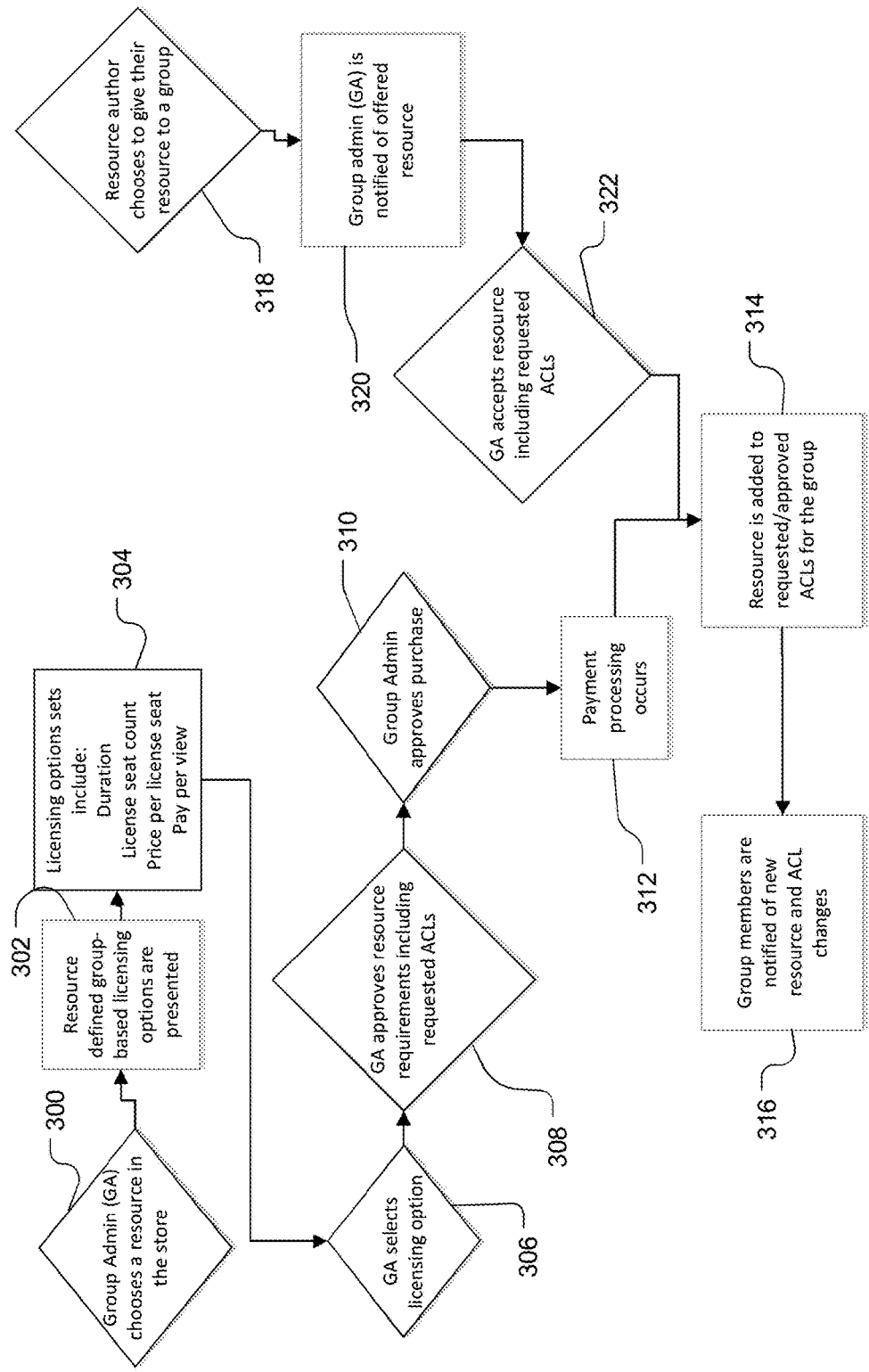
FIG. 3 is a block diagram showing logical flow associated with ordering of and provisioning of user access to educational resources in accordance with an embodiment of the present invention.

FIG. 3 is a block diagram showing logical flow associated with ordering of and provisioning of user access to educational resources in accordance with an embodiment of the present invention. In process 300, a group administrator, acting on behalf of a school administrative entity, chooses an education resource in a store, which is a web-based ordering system. The server implementing the store presents to the group administrator web pages in processes 302 and 304 that specify general licensing terms for the selected resource and are configured to receive an input from the group administrator's client computer of specified licensing parameters, such as license duration, license seat count, and pricing model. In process 306 the group administrator specifies the licensing parameters, and in process 308 approves the resource requirement and specifies an access control list for the resource. The access control list is a list of individuals in the school administrative entity who are to be given access to the resource, and the list includes the e-mail address of each such individual used by the school administrative entity. In process 310, the group administrator, provides approval of the specific license terms, and arrangements for payment in process 312. As a result, in process 314 the resource is added to the individuals on the access control list, and these individual are notified in process 316 of the addition of the resource. The benefit of this approach is a simplified rollout of the resource to the school administrative entity based essentially on the access control list. In an alternative path to adding the resource, the group administrator conducts business in a conventional way (without using online computer-driven processes) with the author or other holder of rights to the resource in processes 318 and 320, and reaches agreement for rights to use the resource in the computer-implemented educational environment. In process 322, the group administrator provides the access control list to the holder of rights to the resource. Thereafter, the process flow is as before. In process 314 the resource is added to the individuals on the access control list, and these individual are notified in process 316 of the addition of the resource.

Figure 4:
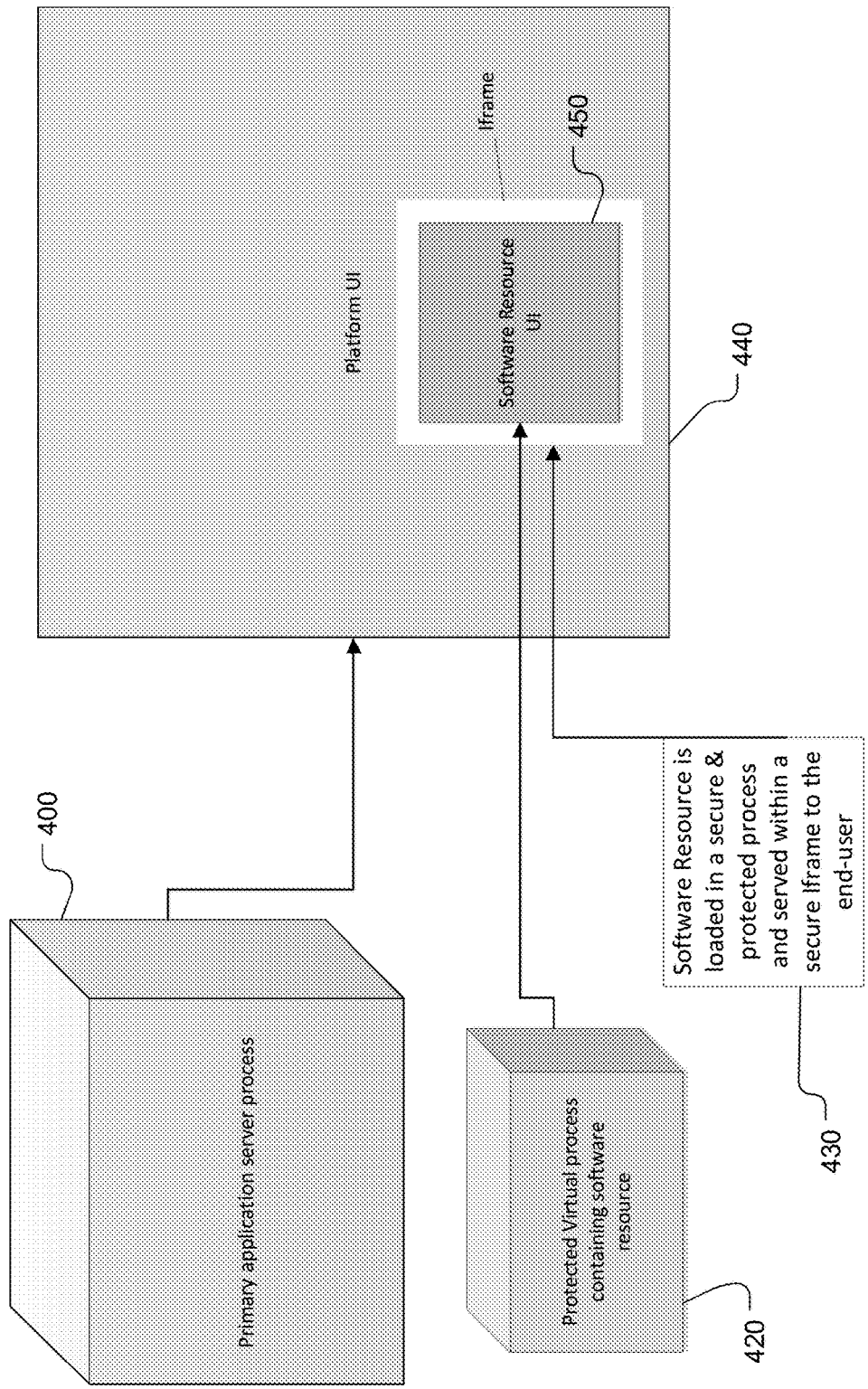
FIG. 4 is diagram of showing system architecture for the embodiment of FIG. 3.

FIG. 4 is a diagram showing system architecture for the embodiment of FIG. 3. In handling the software resource, in a protected process 420, the platform user interface 440 embeds the software resource 450 in an Iframe and serves the resource 450 in that form to the user. The primary application server process 400 feeds the platform user interface 440.

Figure 5:
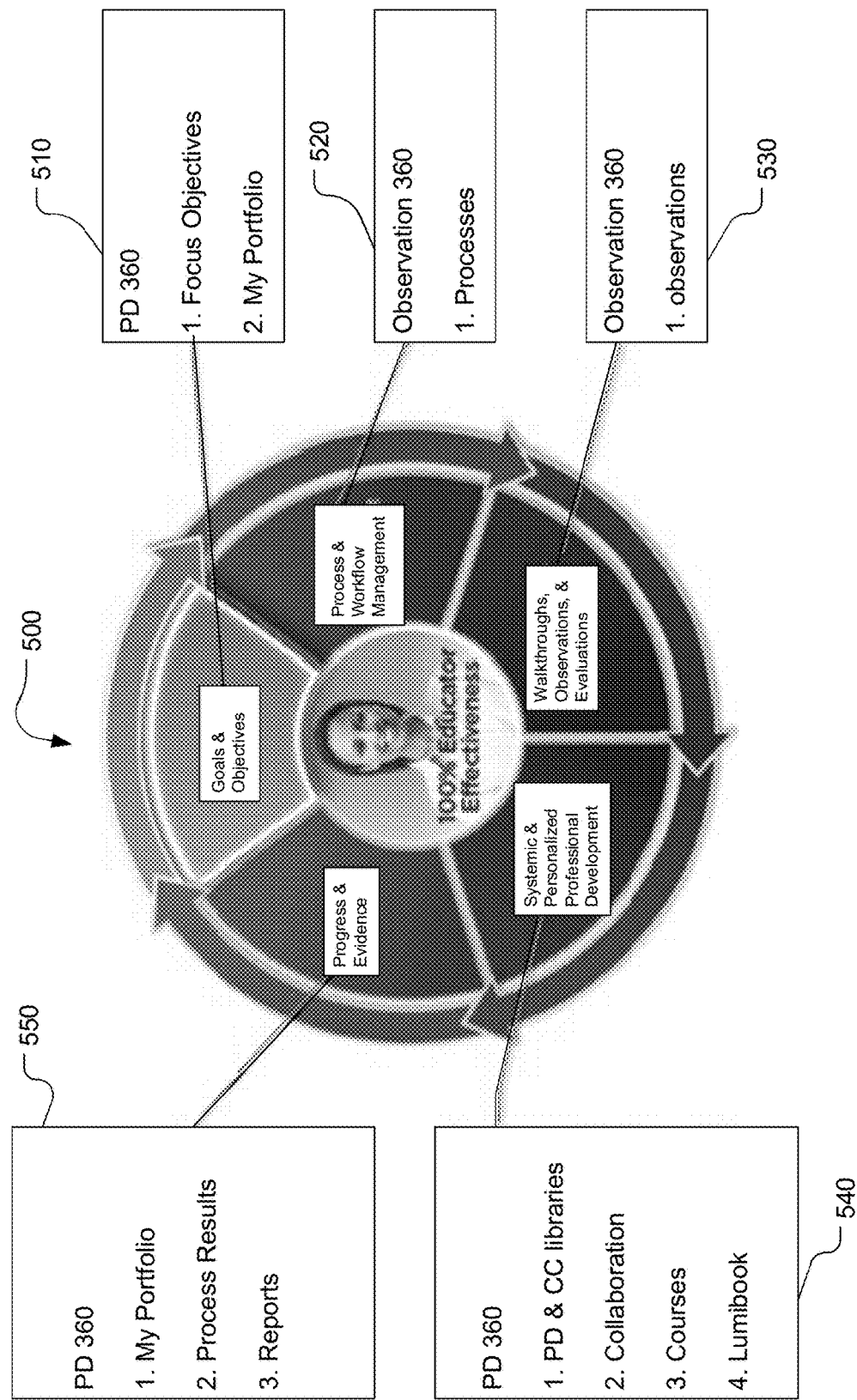
FIG. 5 is a flow diagram showing the interrelation of the teacher and administration components of a computer-implemented environment for improved educator effectiveness in accordance with an embodiment of the present invention.

FIG. 5 is a flow diagram showing the interrelation of the teacher and administration components of a computer-implemented environment for improved educator effectiveness in accordance with an embodiment of the present invention. The wheel 500 is a representation of the circular flow of activities which take place in the school entity body as a structured teacher's improved educator effectiveness progresses through various phases. The procedure may be initiated by a teacher who first defines a learning plan with a set of goals and objectives in the personal workspace of the teachers' components of the computer-implemented environment 510. Alternatively, an administrator may begin to i) structure the learning plan from a set of tasks in an existing structured process or by assembling new sets of task in a new process 520, and ii) schedule observations 530. Once processes and learning plans are established, the teacher can begin to implement them. The teacher, within the teacher's component of the computer-implemented environment, has access to items of educational content 540 assigned to the learning plan. Upon completion of the task, the teacher builds portfolios of evidence that fulfill the requirements of the assigned tasks in the learning plan and visualize reports of results of observations and evaluations 550. The teacher may continue on the path to effectiveness by initiating new sets of goals and objectives and/or the administrator may structure new the learning plans and schedule new observations.

Figure 6:
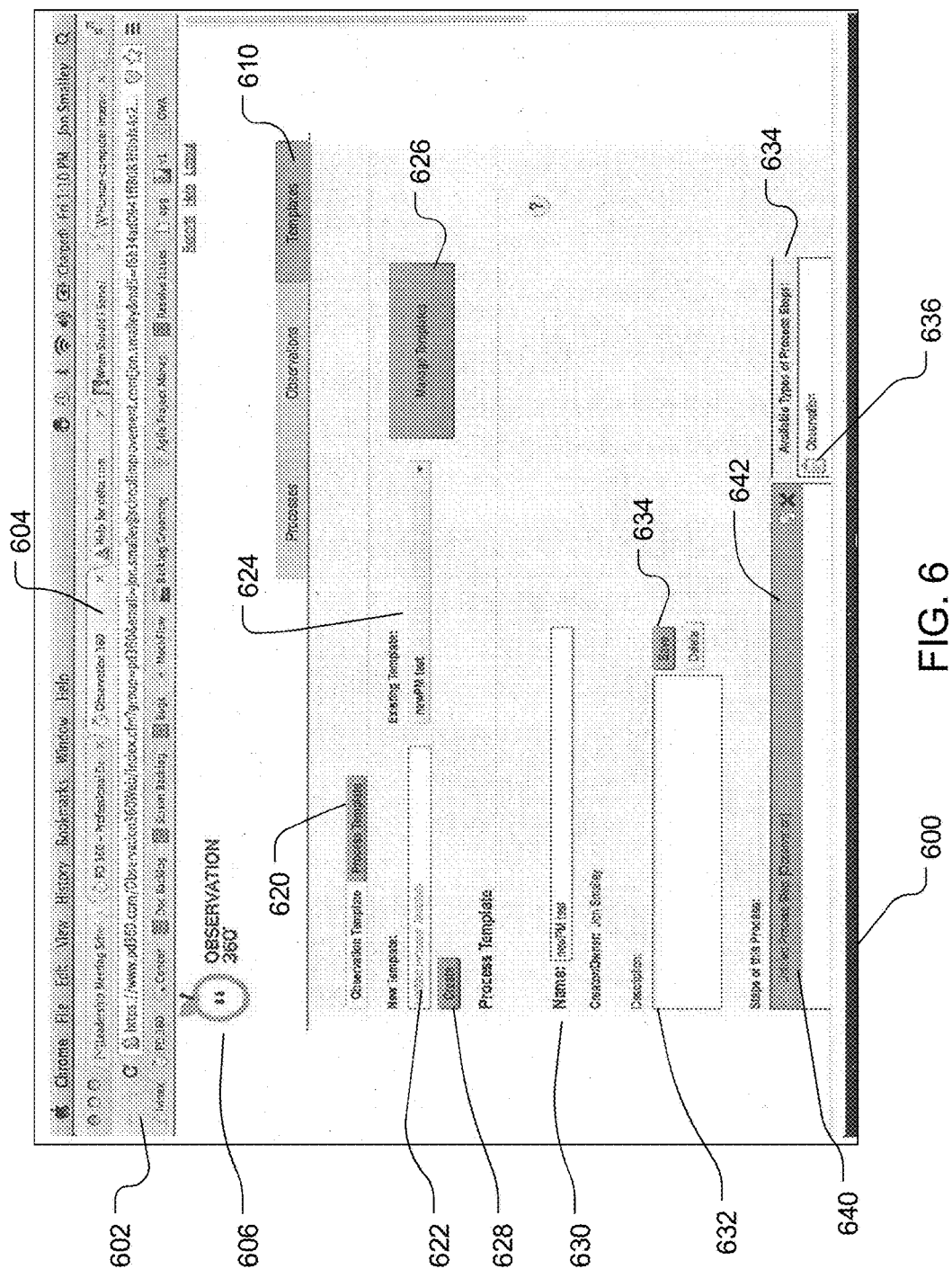
FIG. 6 is a representation of an upper section of a web page viewed in a web browser of a client computer of an administrator displaying a process template in the environment of FIG. 5 to define a process that is to be performed by one or more teacher sin accordance with an embodiment of the present invention.

FIG. 6 is a representation of a computer screen 600 of an upper section of a web page 604 viewed in a web browser 602 of a client computer of an administrator displaying a process template 620 in the environment of FIG. 5 in accordance with an embodiment of the present invention. To define a process that is to be performed by one or more teachers, the administrator has accessed the templates tab 610 of the computer-implemented environment and then selected the process template tab 620. The administrator has then the choice of creating a new process template by entering a name for that template in the field 622 and clicking on the create button 628 or selecting an existing template from a drop down list 624. In this case display of the first step in the selected process template appears in the lower section of the screen 600. The name of the template appears again in window 630, and the creator/owner of the template is reproduced below it. A description field 632 is accessible to provide details about the process, and the administrator can save all changes in the process by clicking the save button 634. An option to delete the process is also available. A series of steps 642 is listed in a table 640. In defining each step, there can be designated a type from a menu 634 of types of tasks 636. A title may be attributed to the task. The tasks 642 may also be removed selectively from the table 640.

Figure 7:
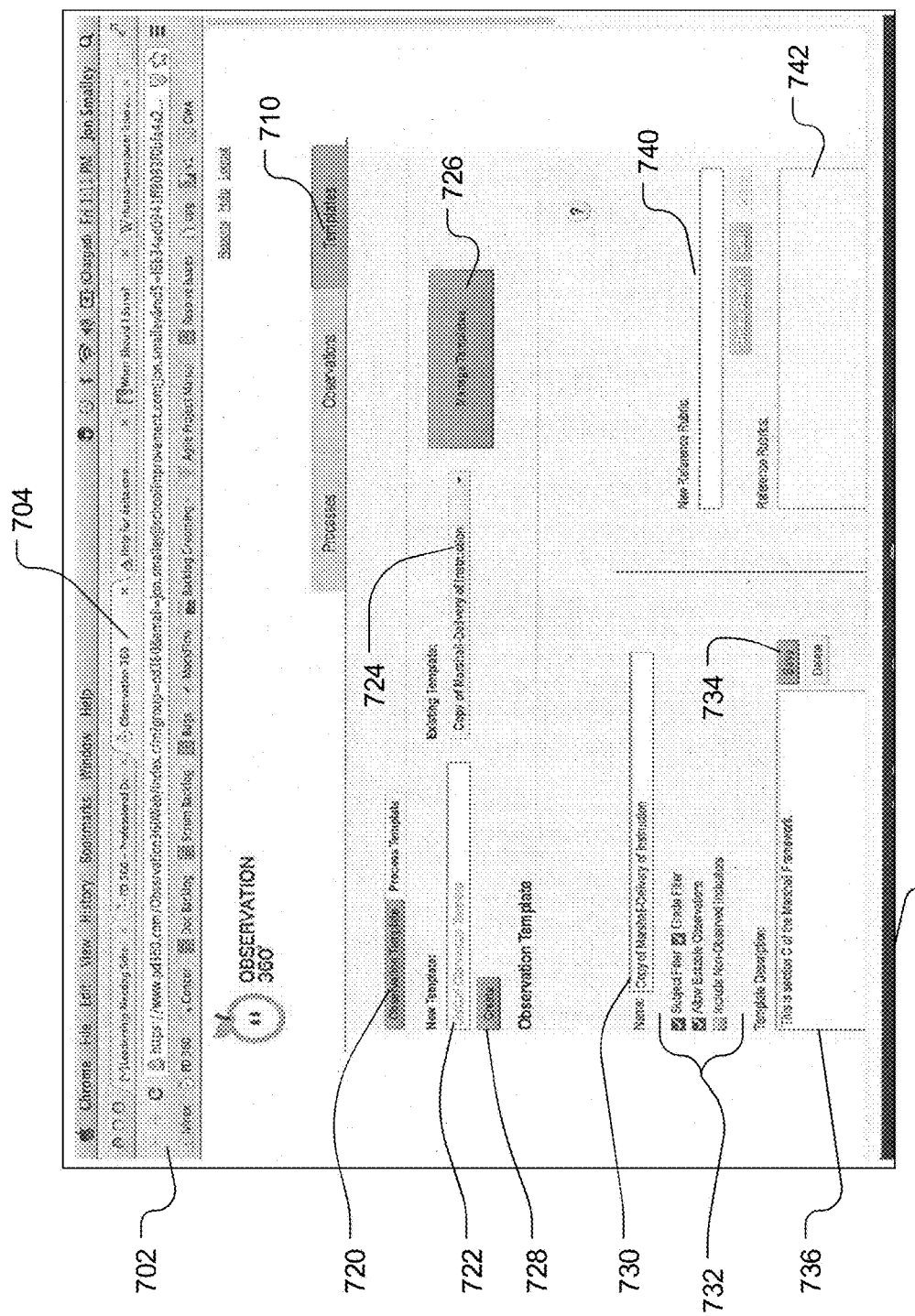
FIG. 7 is a representation of an upper section of a web page, viewed in a web browser of a client computer of an administrator, displaying an observation template in the environment of FIG. 5 to define workflow associated with an observation in accordance with an embodiment of the present invention.

FIG. 7 is a representation of a computer screen 700 of an upper section of a web page 704, viewed in a web browser 702 of a client computer of an administrator, displaying an observation template 720 in the environment of FIG. 5 in accordance with an embodiment of the present invention. To define workflow associated with an observation of one or more teachers, the administrator accesses the templates tab 710 of the computer-implemented environment and then selected the process template tab 720. The administrator has then the choice of creating a new observation template by entering a name for that template in the field 722 clicking on the create button 728 or selecting an existing template from a drop down list 724. The display of an observation template begins in the lower section of the screen 700. The name of the template appears again in window 730. A set of features 732 to define characteristics of the observation may be selected. A variety of fields 736, 740 and 742 may be used to further describe the type of observation template. The administrator can save all changes in the process by clicking the save button 734. An option to delete the observation template is also available.

Figure 8:
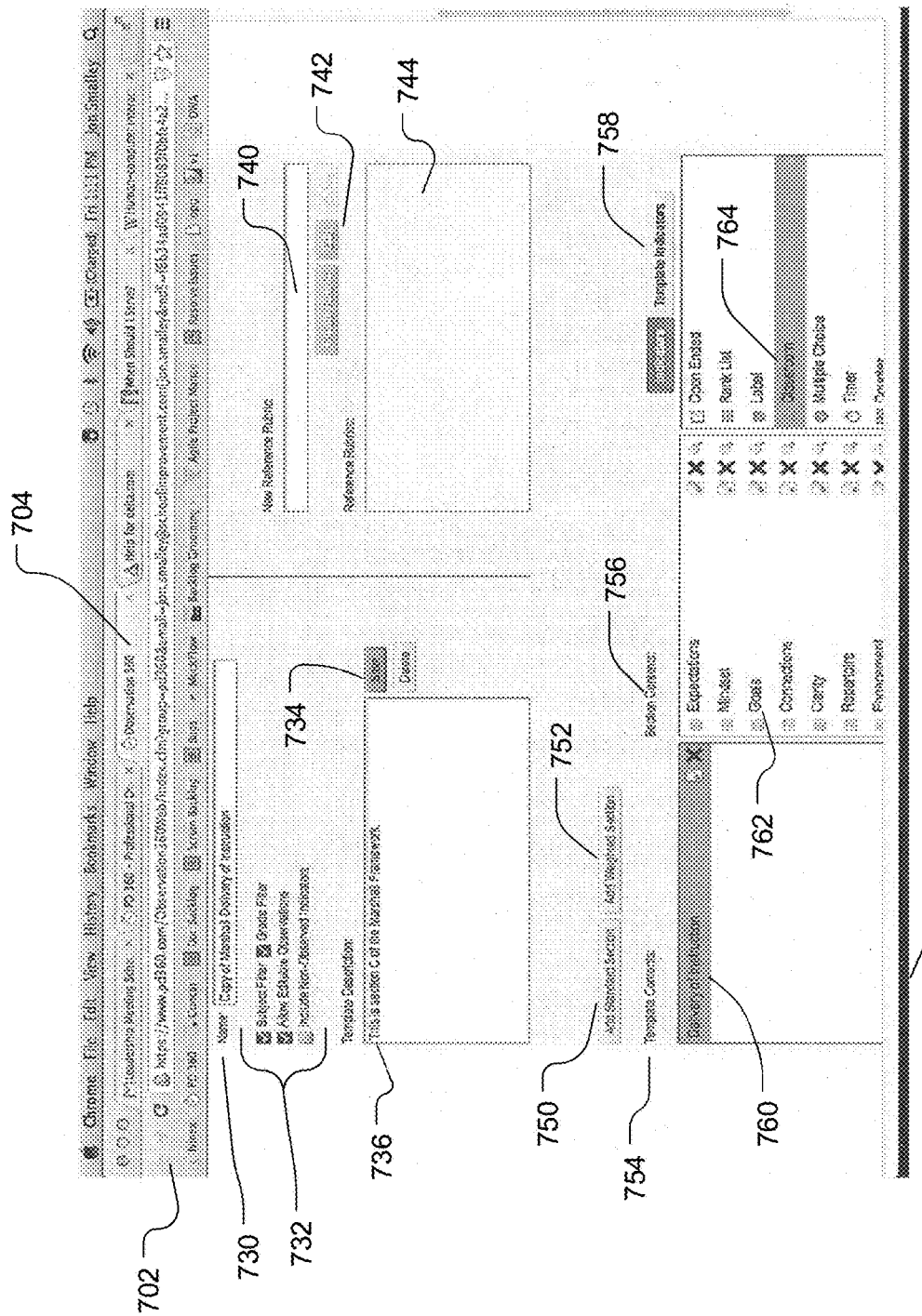
FIG. 8 is a representation of a middle section of the web page of FIG. 7.

FIG. 8 is a representation of a middle section of the web page of FIG. 7. A number of sections 750 and 752 may be added to the observation template. The observation template content 754 is listed in a table where each item 760 can be labeled. The item may also be deleted. A menu section 756 of content items 762 that can be added to the item 760 is available. Also available is a menu 758 of indicators 764.

Figure 9:
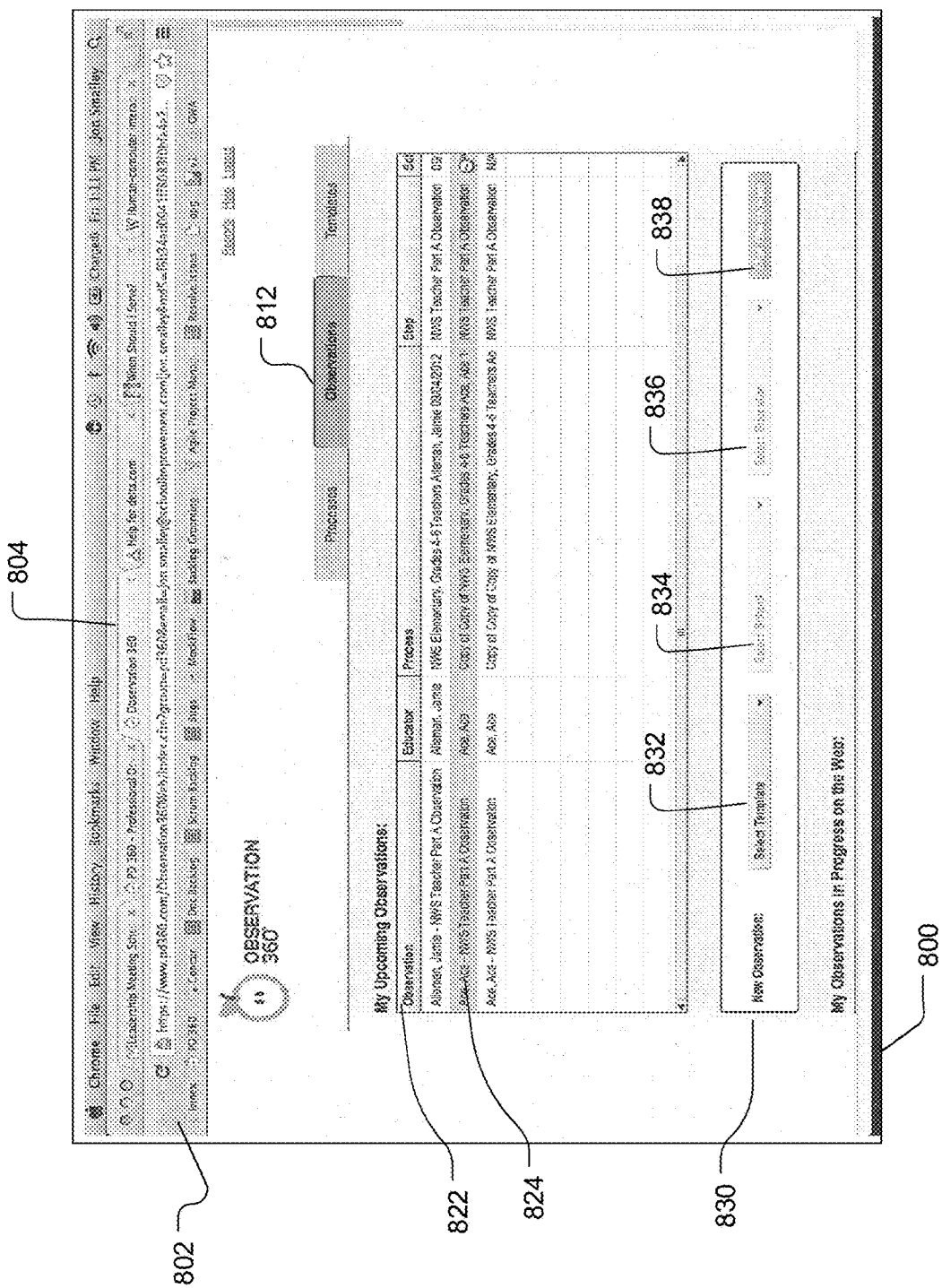
FIG. 9 is a representation of an upper section of a web page in the environment of FIG. 5, viewed in a web browser of a client computer of an observer, displaying upcoming observations that have been scheduled for the observer in accordance with an embodiment of the present invention.
Figure 10:
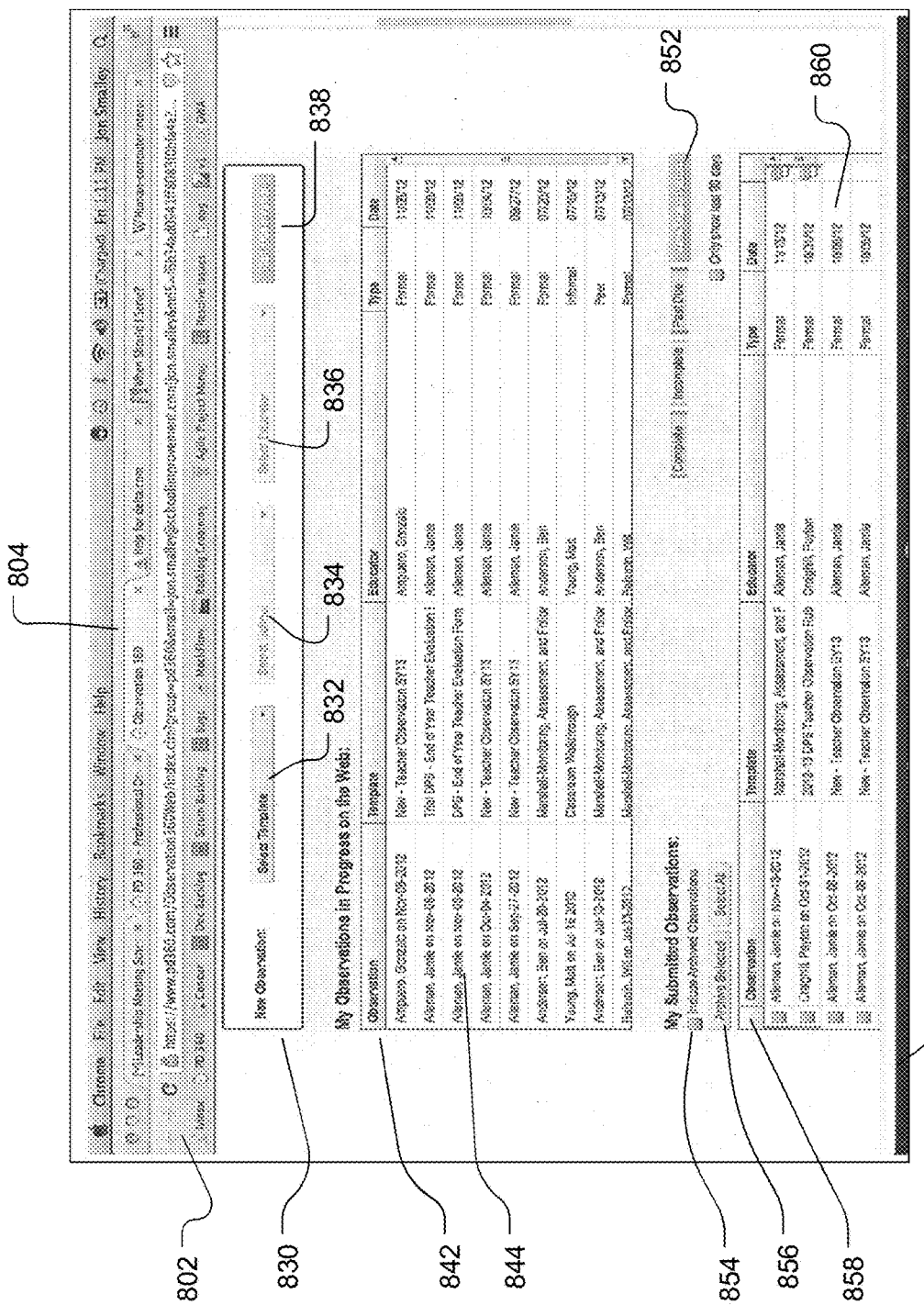
FIG. 10 is a representation of a middle section of a web page of FIG. 9 in the environment of FIG. 5, viewed in a web browser of a client computer of an observer, displaying a listing of observations in progress and in a lower panel a listing observations for which comments have been submitted by the observer.

FIGS. 9 and 10 are a representations of a computer screen 800 of an upper section (FIG. 9) and middle section (FIG. 10) of a web page 804 in the environment of FIG. 5, viewed in a web browser 802 of a client computer of an observer, displaying table 822 of upcoming observations 824 that have been scheduled for the observer, table 842 of observations in progress 844, and table 858 of submitted observations 860 in accordance with an embodiment of the present invention. This screen is on the processes tab 812. A menu 830 for creating new observations is available from this web page 804 with access to the observation templates 832 created in accordance with FIGS. 7 and 8, and assignable to a school 834 or an educator 836 from drop down menus. The observation is then generated by clicking the button 838. A submitted observation can be viewed in categories including complete, incomplete, and past due, and a selected observation can be viewed by using button 852. Additional features 854, 856 for managing these observations may also be provided.

Figure 11:
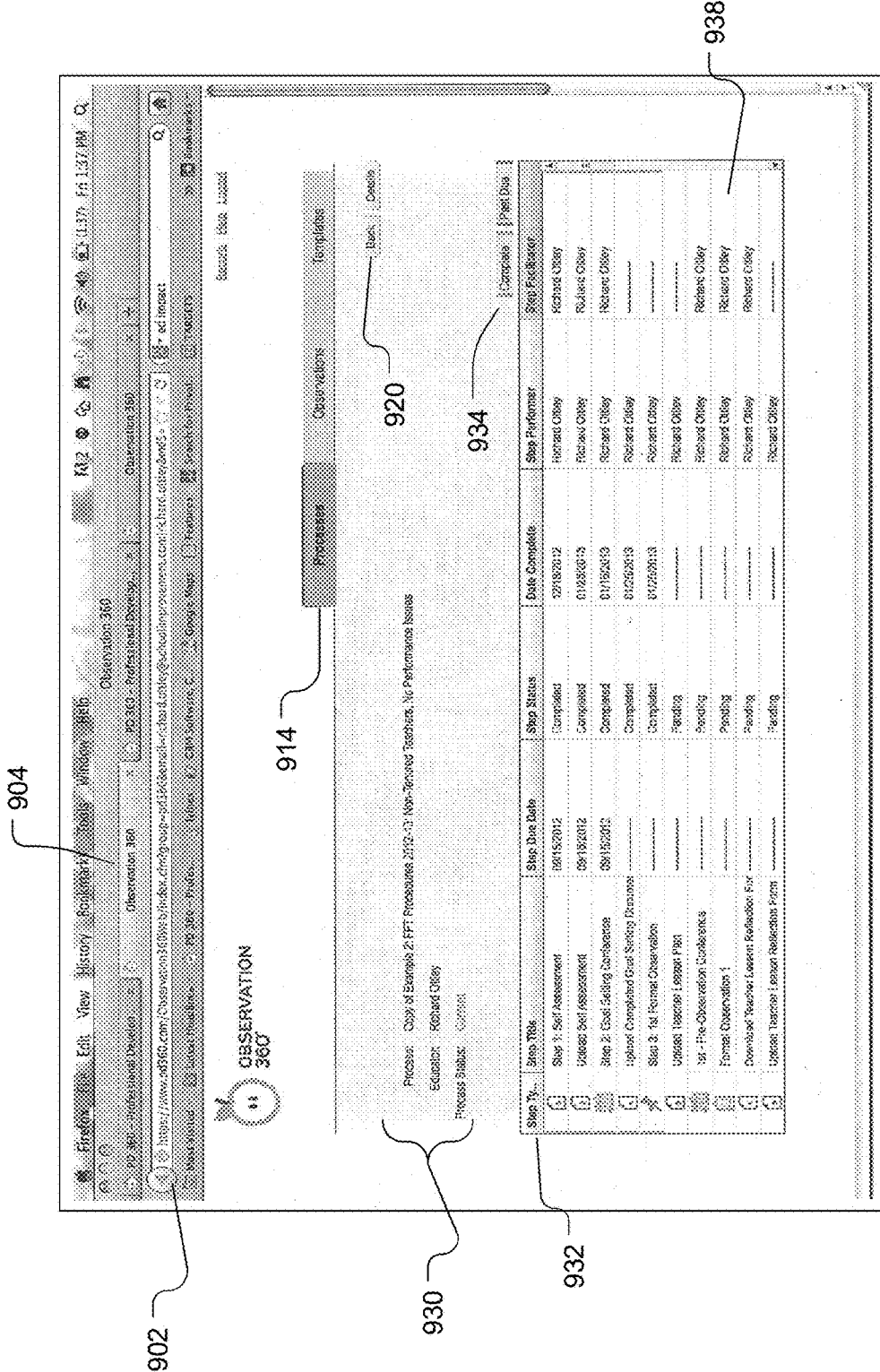
FIG. 11 is a representation of a top section of a web page in the environment of FIG. 5, viewed in a web browser of a client computer of an administrator, displaying for a specific process assigned to a specific teacher the steps in the process and completion status of each step, in accordance with an embodiment of the present invention.

FIG. 11 is a representation of a computer screen 900 of a top section of a web page 904 in the environment of FIG. 5, viewed in a web browser 902 of a client computer of an administrator, displaying for a specific process assigned to a specific teacher 930 a table 932 of the steps 938 in the process and completion status 934 of each step, in accordance with an embodiment of the present invention. This screen is on the processes tab 914.

Figure 12:
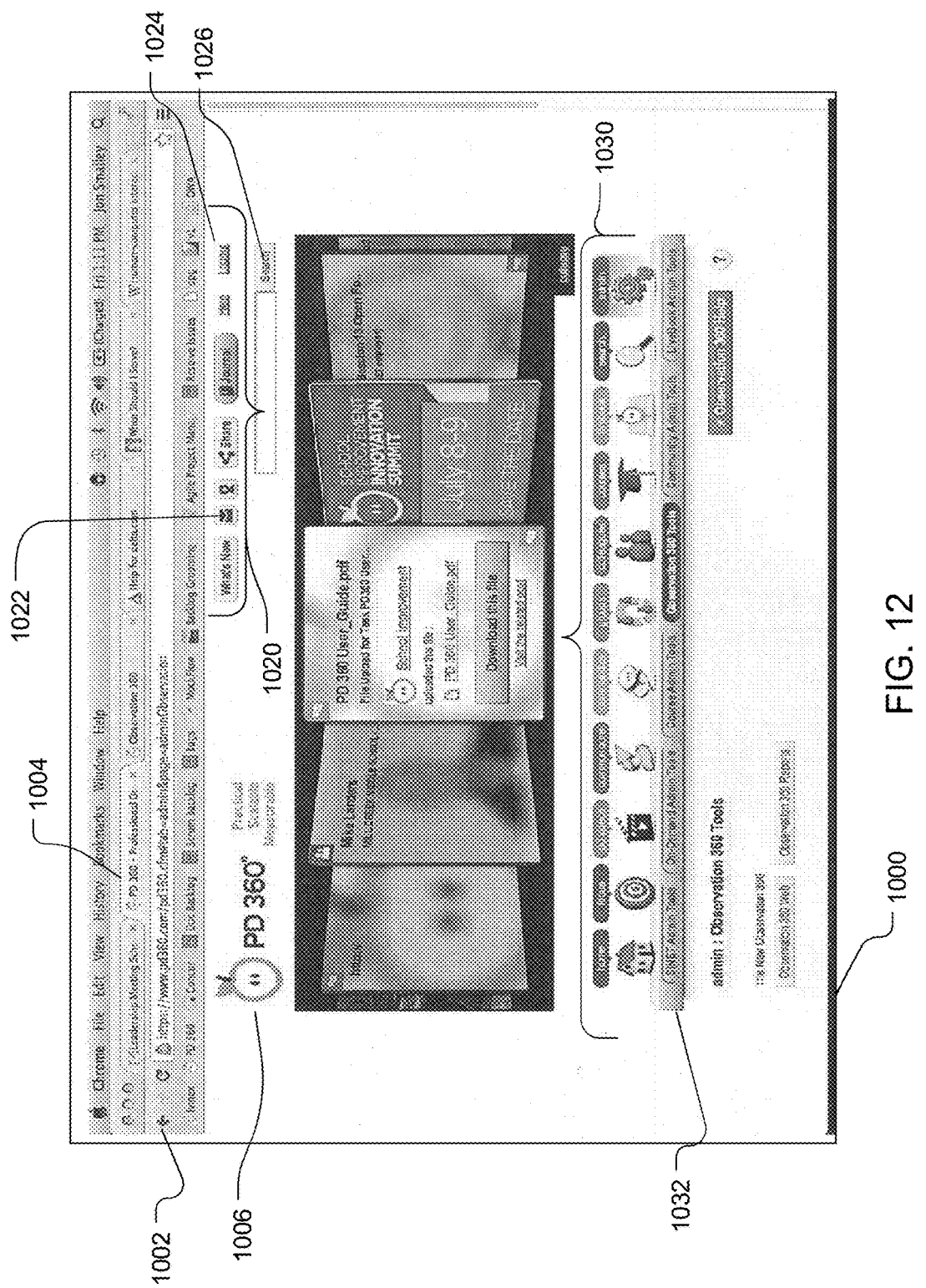
FIG. 12 is a representation of a web page in the environment of FIG. 5, viewed in a web browser of a client computer of an administrator displaying administration options for a professional development application for teachers and additionally showing user navigation menu within the application, all in accordance with an embodiment of the present invention.

FIG. 12 is a representation of a computer screen 1000 of a web page 1004 in the environment of FIG. 5, viewed in a web browser 1002 of a client computer of an administrator displaying administration options 1032 for a professional development application 1006 for teachers and additionally showing user navigation menu 1030 within the application, all in accordance with an embodiment of the present invention. Quick access buttons 1020 are provided to access the user's message box 1022, or logout 1024, for example. A search field 1026 may also be provided.

Figure 13:
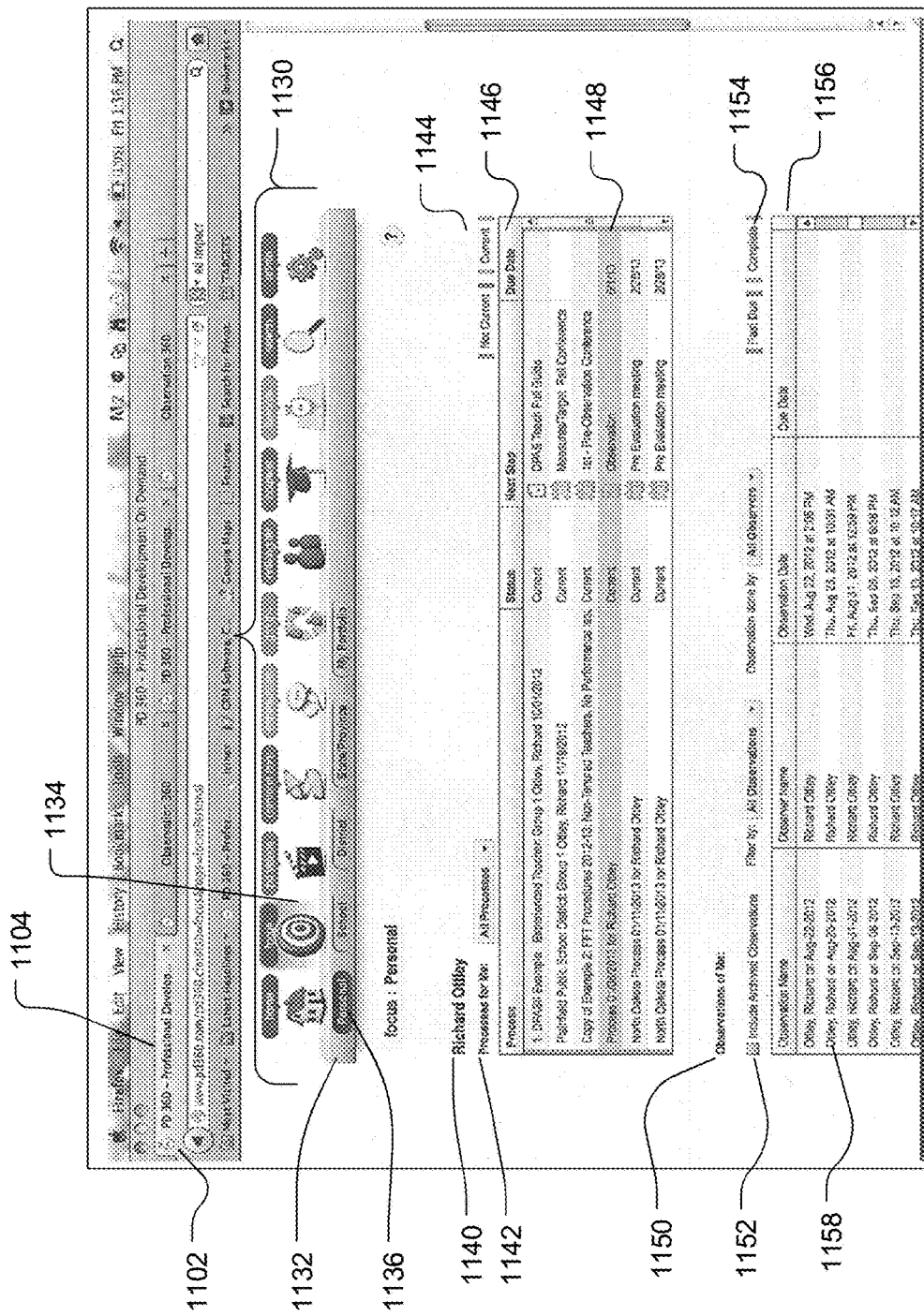
FIG. 13 is a representation of an upper section of a web page, in the environment of FIG. 5 viewed in a web browser of a client computer of a teacher, displaying in the professional development application of FIG. 12 processes (in the upper panel, showing status information) and observations (in the lower panel, showing date information) defined for the teacher and in accordance with an embodiment of the present invention.

FIG. 13 is a representation of a computer screen 1100 of an upper section of a web page 1104, in the environment of FIG. 5 viewed in a web browser 1102 of a client computer of a teacher 1140, displaying in the professional development application of FIG. 12 tables 1146 and 1156 of processes (in the upper panel) and observations (in the lower panel, showing date information) with their status information, defined for the teacher, all in accordance with an embodiment of the present invention. The display within the table may be filtered using items 1152. Navigation menu 1130 and submenu display the subject of the page with highlighting of the symbols 1134 and 1136 in these menus.

Figure 14:
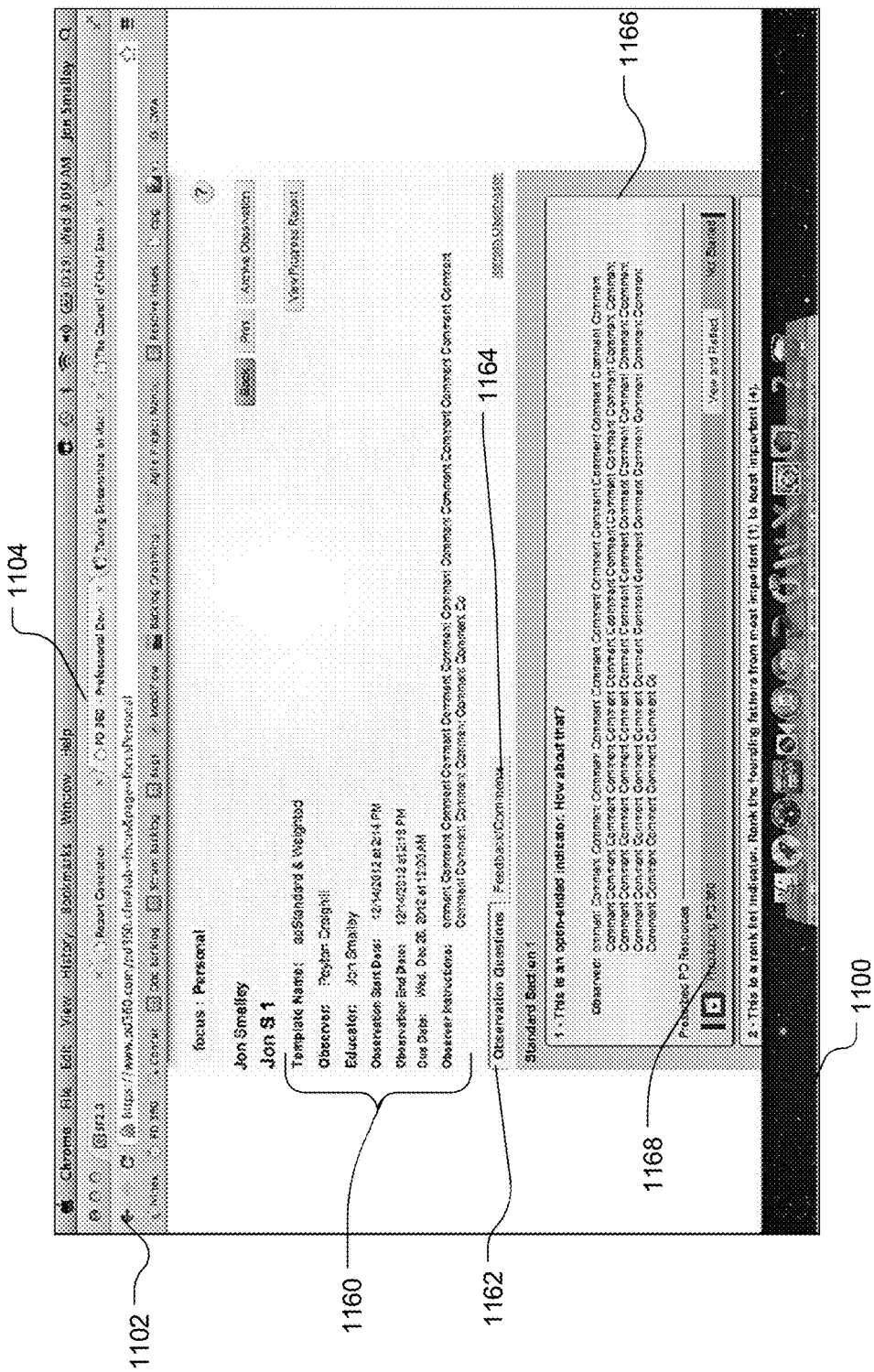
FIG. 14 is a representation of an upper section of a web page, in the environment of FIG. 5 viewed in a web browser of a client computer of a teacher, displaying in the professional development application of FIG. 12 results of an observation of the teacher, showing comments of the observer, an area where the observer can recommend professional development resources to the teacher, and a designated region wherein the teacher can provide a feedback comment to the results of the observation in accordance with an embodiment of the present invention.

FIG. 14 is a representation of a computer screen 1100 of an upper section of a web page 1104, in the environment of FIG. 5 viewed in a web browser 1102 of a client computer of a teacher, displaying in the professional development application of FIG. 12 results of an observation of the teacher by an observer (identified in section 1160), selected from the table 1156 of FIG. 13, showing comments of the observer 1162 in tab 1162, an area 1168 where the observer can recommend professional development resources to the teacher, and a designated tab 1164 on which the teacher can provide a feedback or comments to the results of the observation in accordance with an embodiment of the present invention.

Figure 15:
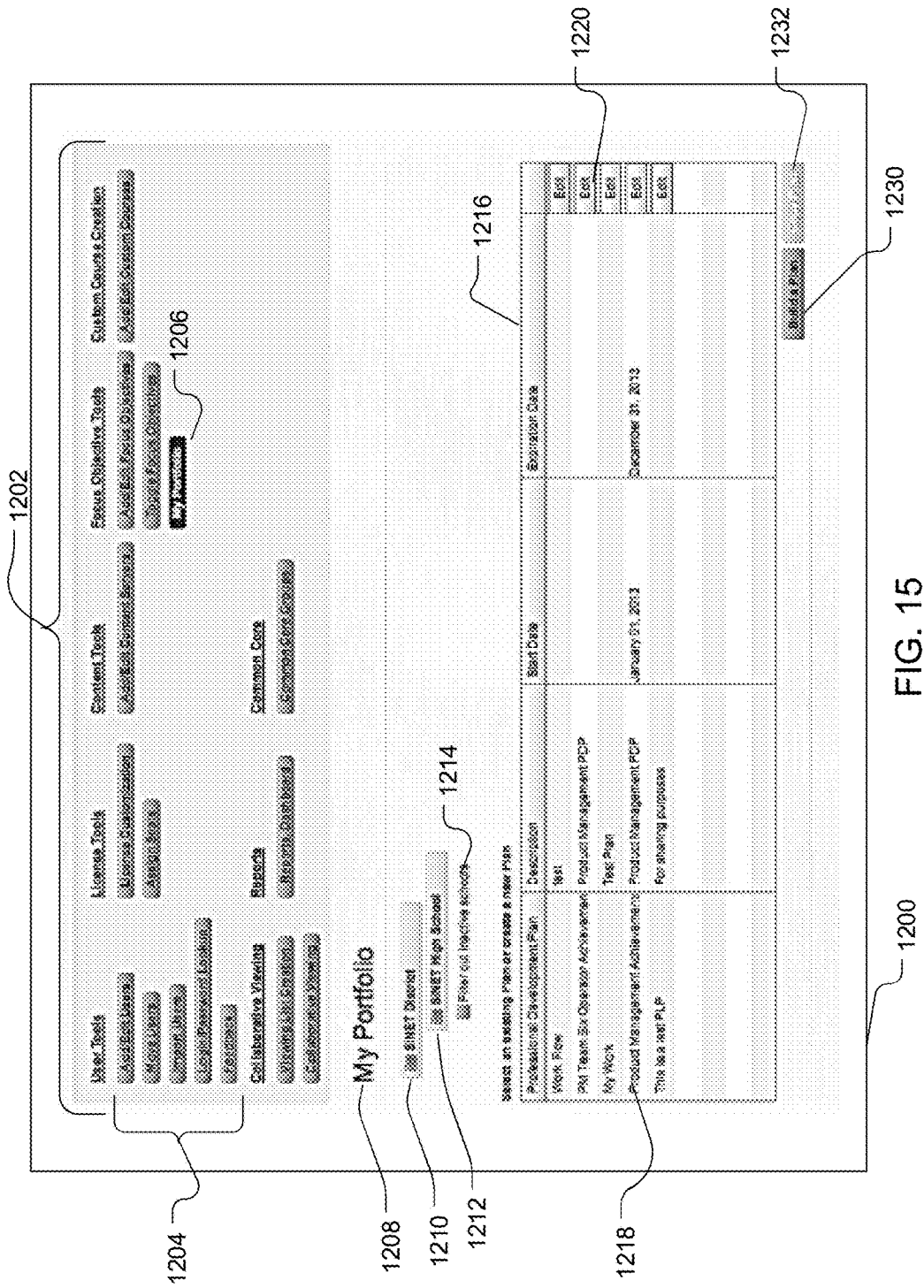
FIG. 15 is a representation of an upper section of a web page in the environment of FIG. 5, viewed in a web browser of a client computer of an administrator, displaying administrator tools for the professional development application of FIG. 12 to define structure of a professional development plan for teachers in accordance with an embodiment of the present invention.

FIG. 15 is a representation of a computer screen 1200 of an upper section of a web page in the environment of FIG. 5, viewed in a web browser of a client computer of an administrator, displaying a menu 1202 of administrator tools 1204 for managing the professional development application of FIG. 12. Here the tool 1206 relates to My Portfolio, which is being configured for a specific set of plans for a specific school district 1210 in a specific school 1212. Here the administrator is able to define structures of a professional development plan for teachers in accordance with an embodiment of the present invention. Plans 1218, listed in a table 1216, can either be built by accessing the button 1230 or edited from existing plans by selecting the corresponding button 1220. A plan can also be copied 1232 from an existing one.

Figure 16:
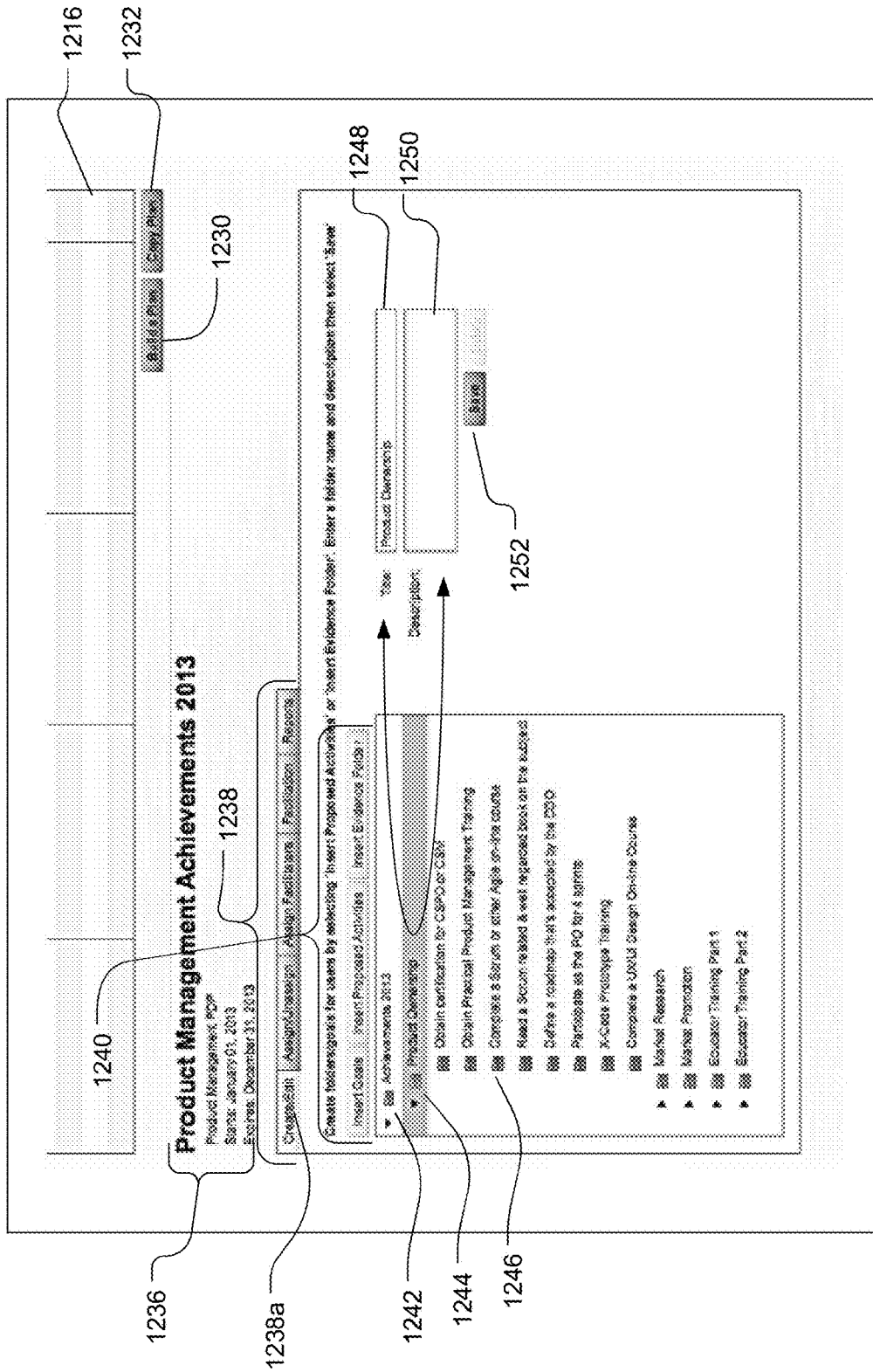
FIG. 16 is a representation of a middle section of the web page of FIG. 15 for assigning specific activities in connection with the professional development plan.
Figure 17:
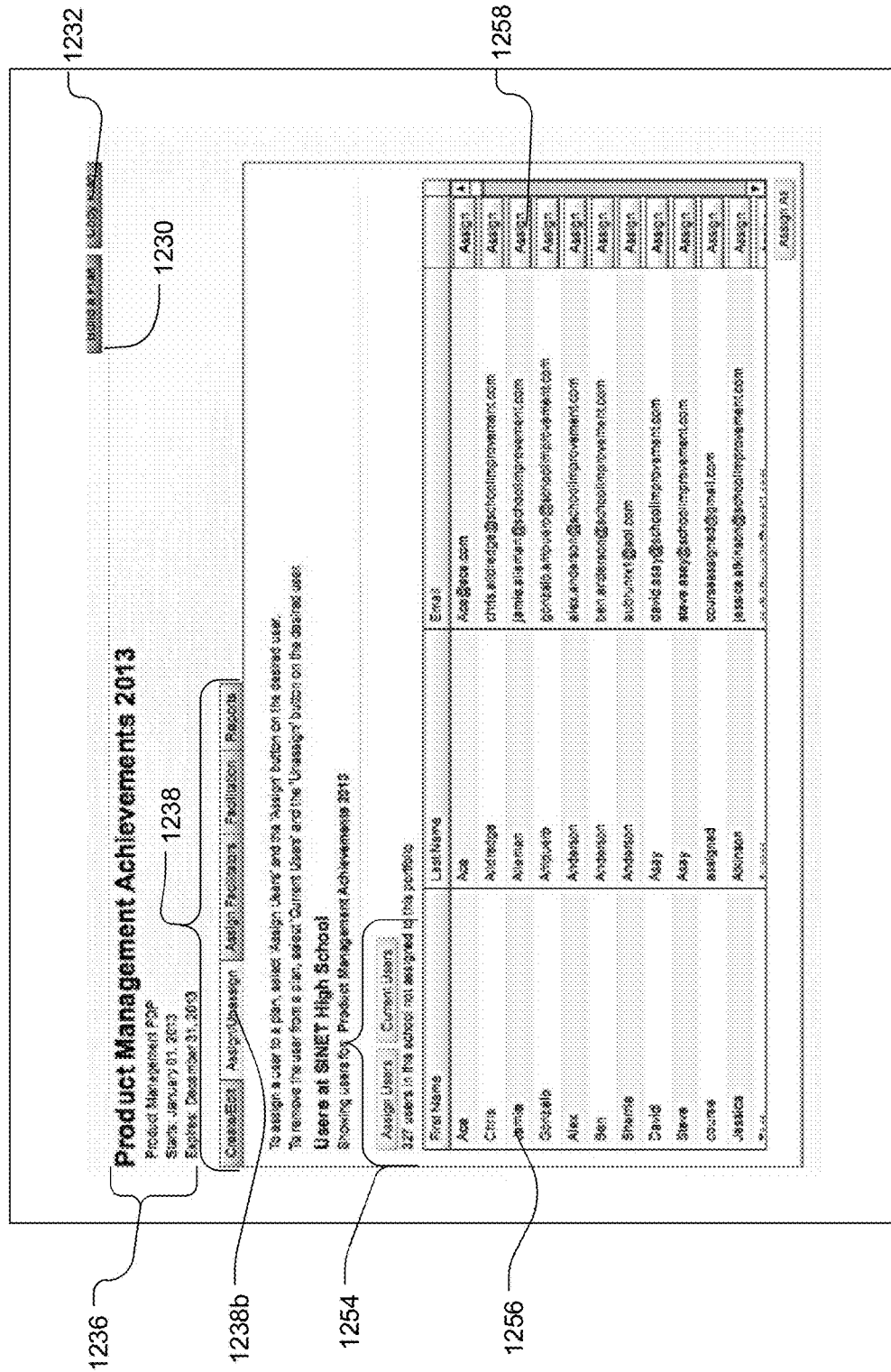
FIG. 17 is a representation of a middle section of the web page of FIG. 15 for assigning teachers to the professional development plan and identifying those teachers who have been assigned to the plan.
Figure 18:
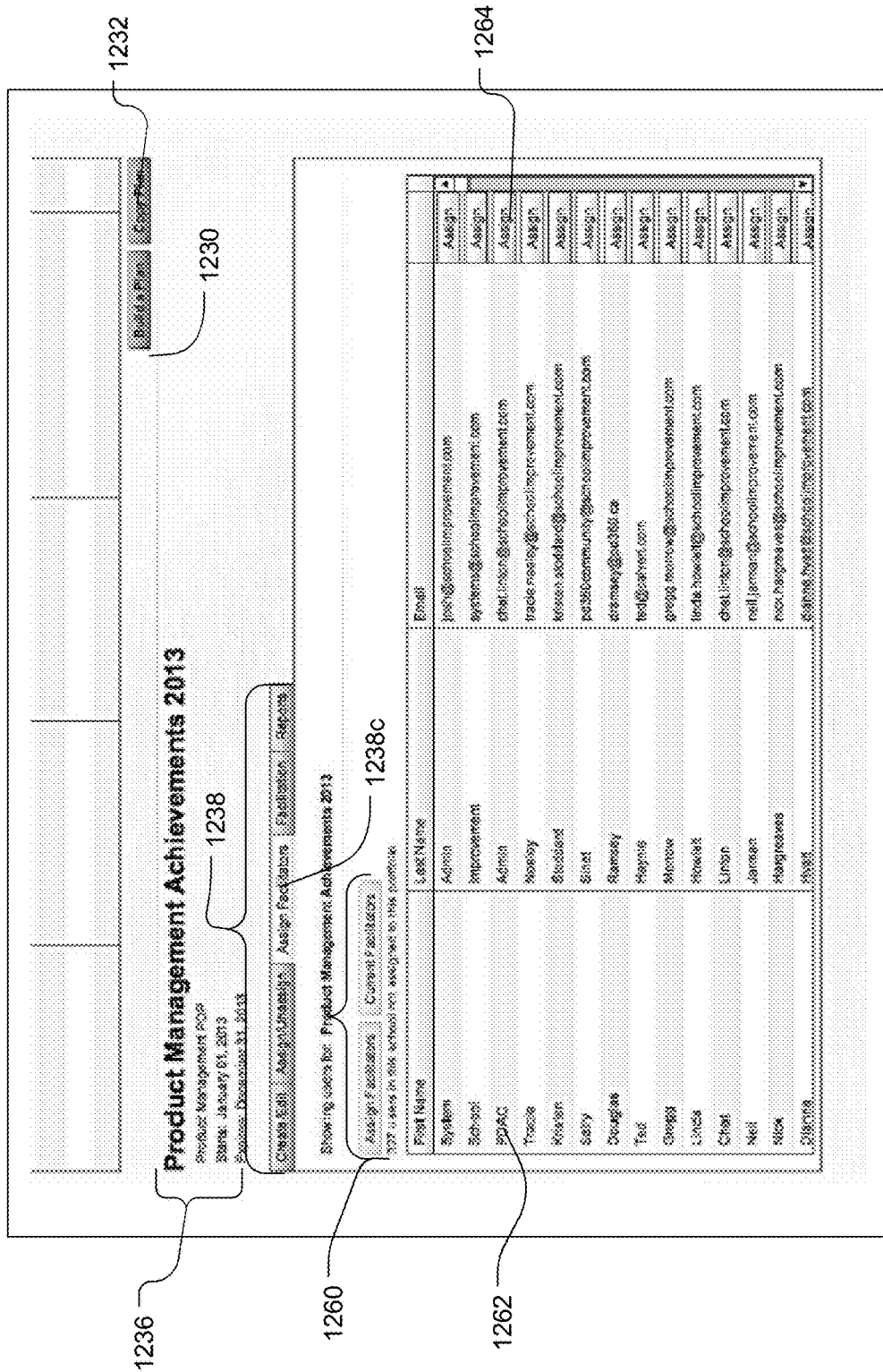
FIG. 18 is a representation of a middle section of the web page of FIG. 15 showing a tab for assigning facilitators to a teacher in connection with t the plan.
Figure 19:
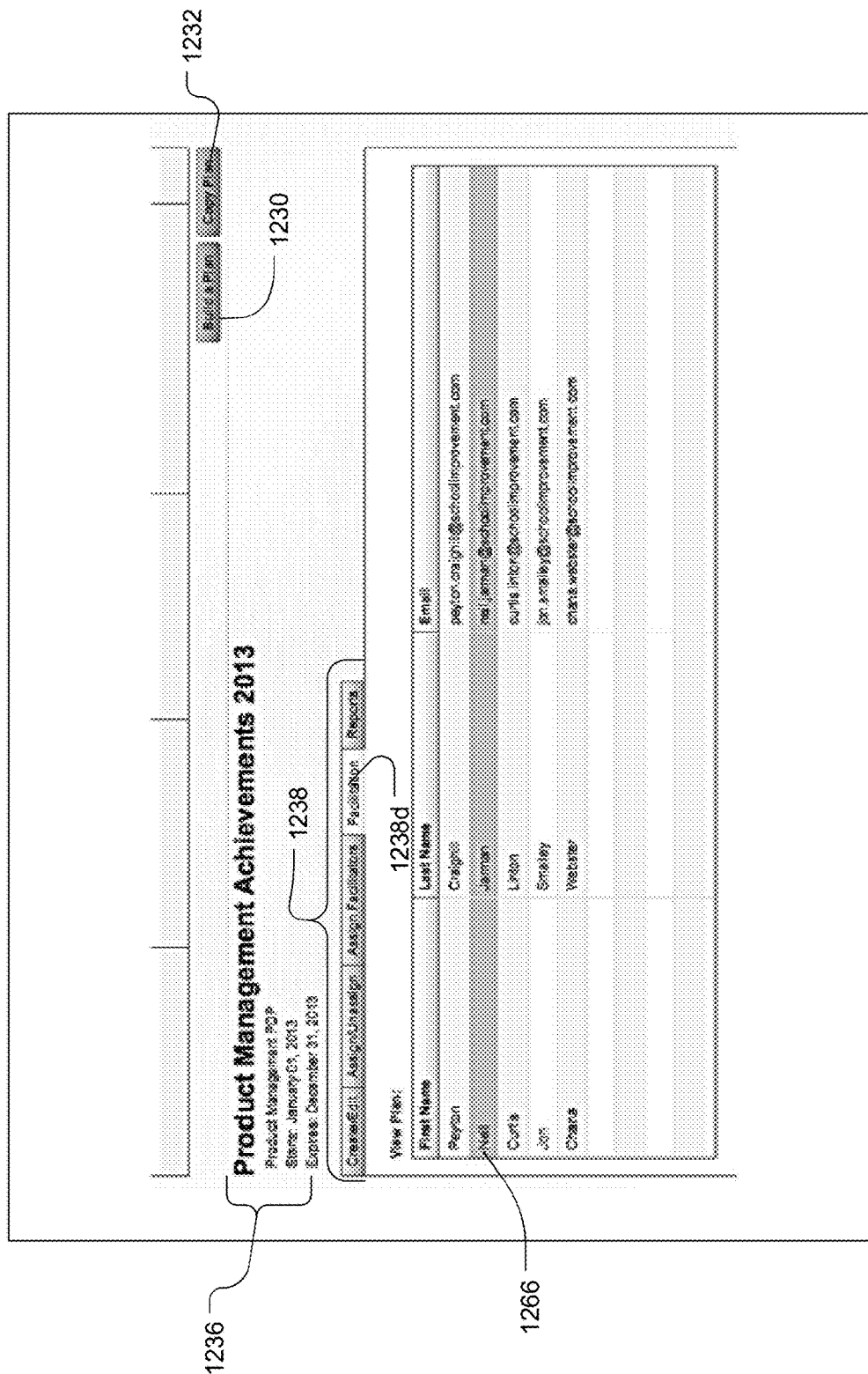
FIG. 19 is a representation of a middle section of the web page of FIG. 15 displaying on a tab for facilitation of the plan, a listing of teachers who have been assigned to the plan.
Figure 20:
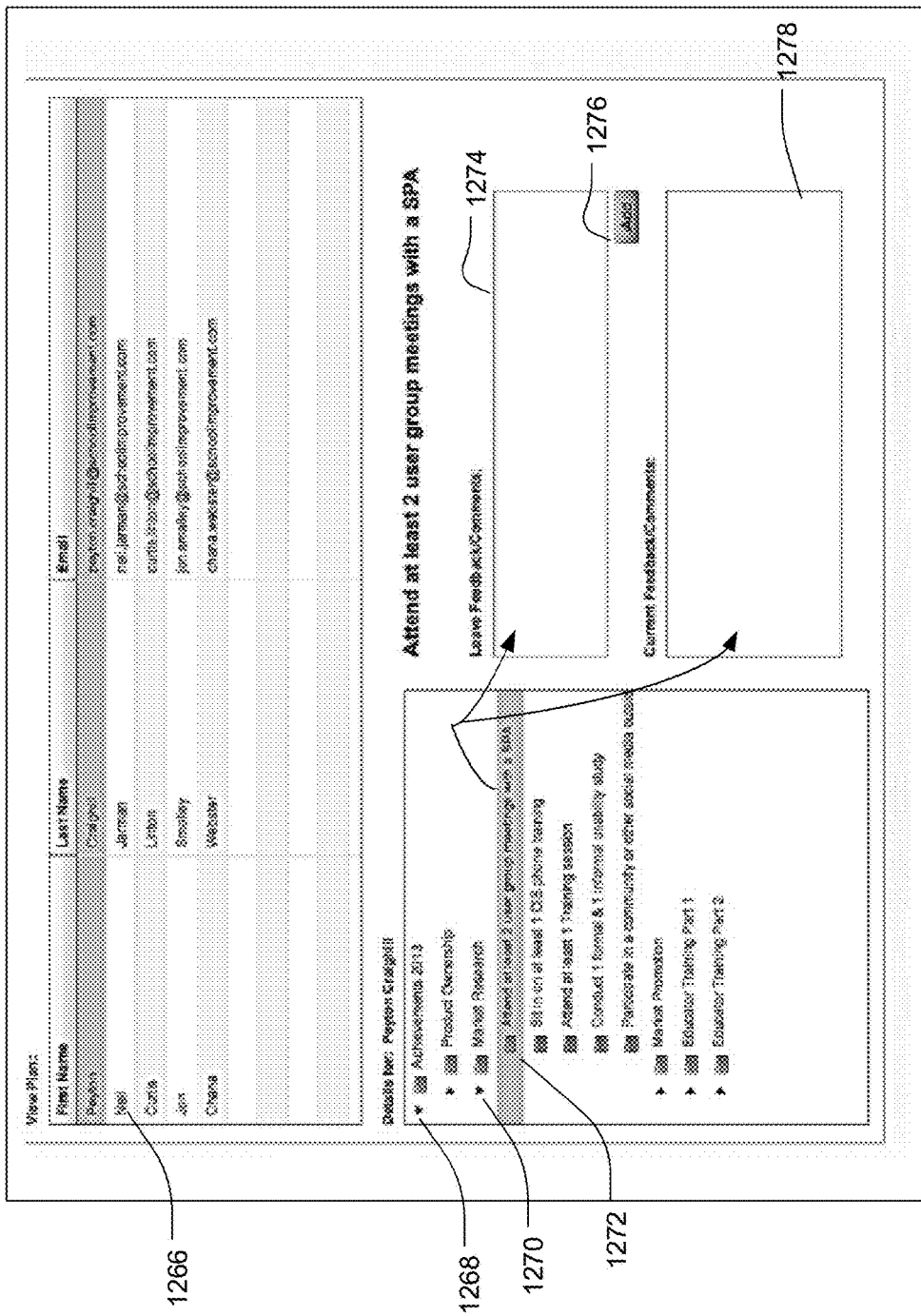
FIG. 20 is a representation of a lower section of the web page of FIG. 19 displaying, for the teacher selected in the listing, activities associated with the plan, and for the activity selected, and a box for leaving feedback and a box for receiving feedback.
Figure 21:
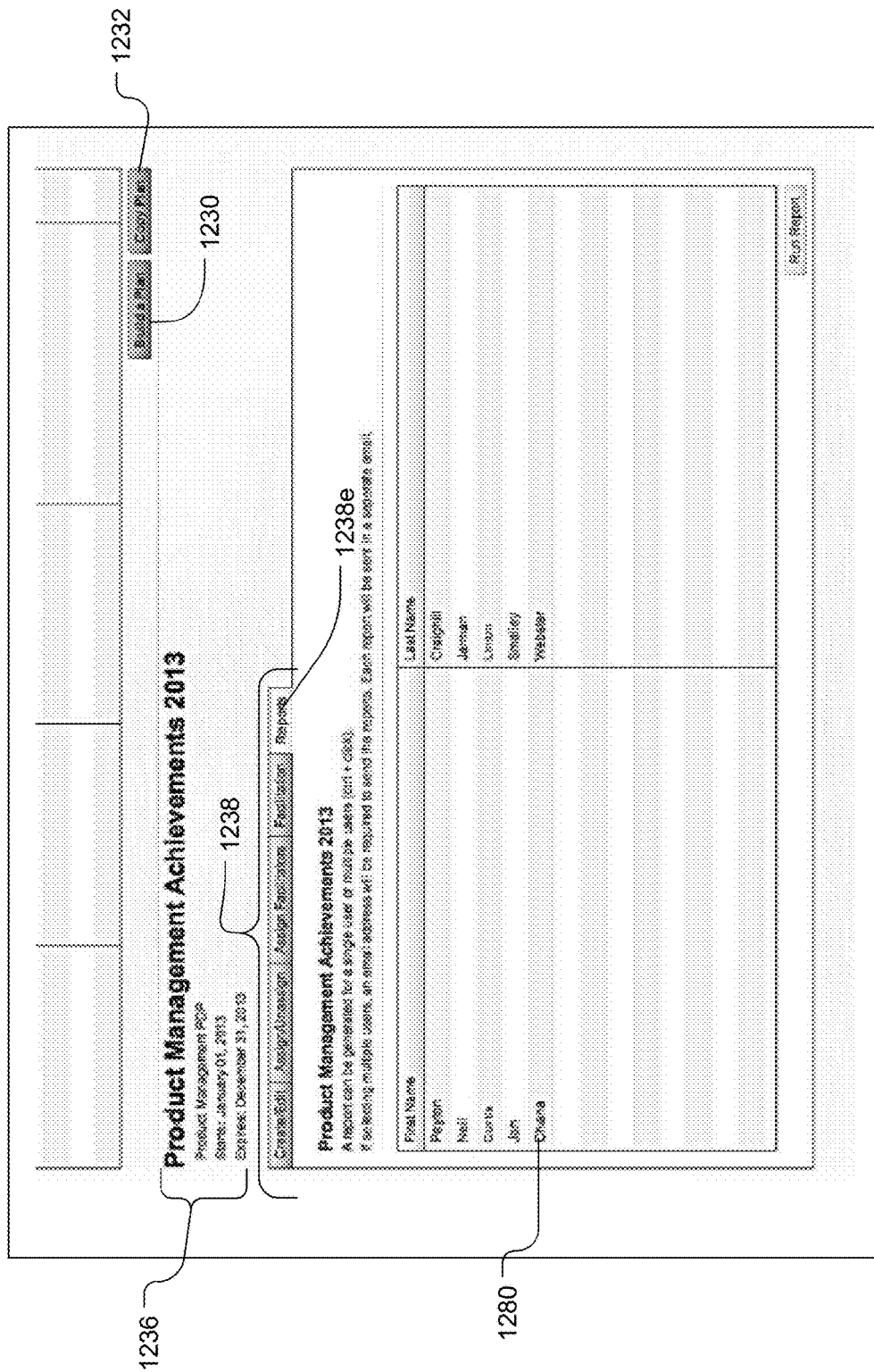
FIG. 21 is a representation of a middle section of the web page of FIG. 15, a view on a tab for generating a report of for one or more teachers who have been assigned to the plan.

Details of a selected plan can be viewed in FIGS. 16-21, wherein tools 1238, are made available to build the plan. FIG. 16 displays further tools 1240 from the create/edit tab 1238a, in which the structure of the plan is displayed by the hierarchically organized folders 1242, 1244, and 1246. A folder can be assigned a title and a descriptions in fields 1248 and 1250 respectively. As shown in FIG. 17, on the tab 1238b, an administrator can assign users 1256 of the plan with the use of the button 1258. As shown in FIG. 18, similarly, on tab 1238c, an administrator can assign facilitators 1262 of the plan with the use of the button 1264. As shown in FIG. 19, on tab 1238d, an administrator can view a listing of ongoing facilitation of teachers 1266. Details of these facilitations may be reviewed, as shown in FIG. 20, where the administrators can review in 1278 or add in comments or feedback using the open field 1274 with add button 1276 with respect to a task 1272, of an activity 1270 in the plan 1268. As shown in FIG. 21, on the reports tab 1238e, the administrator can also run reports for a teacher 1280 who has been assigned to the plan.

Figure 22:
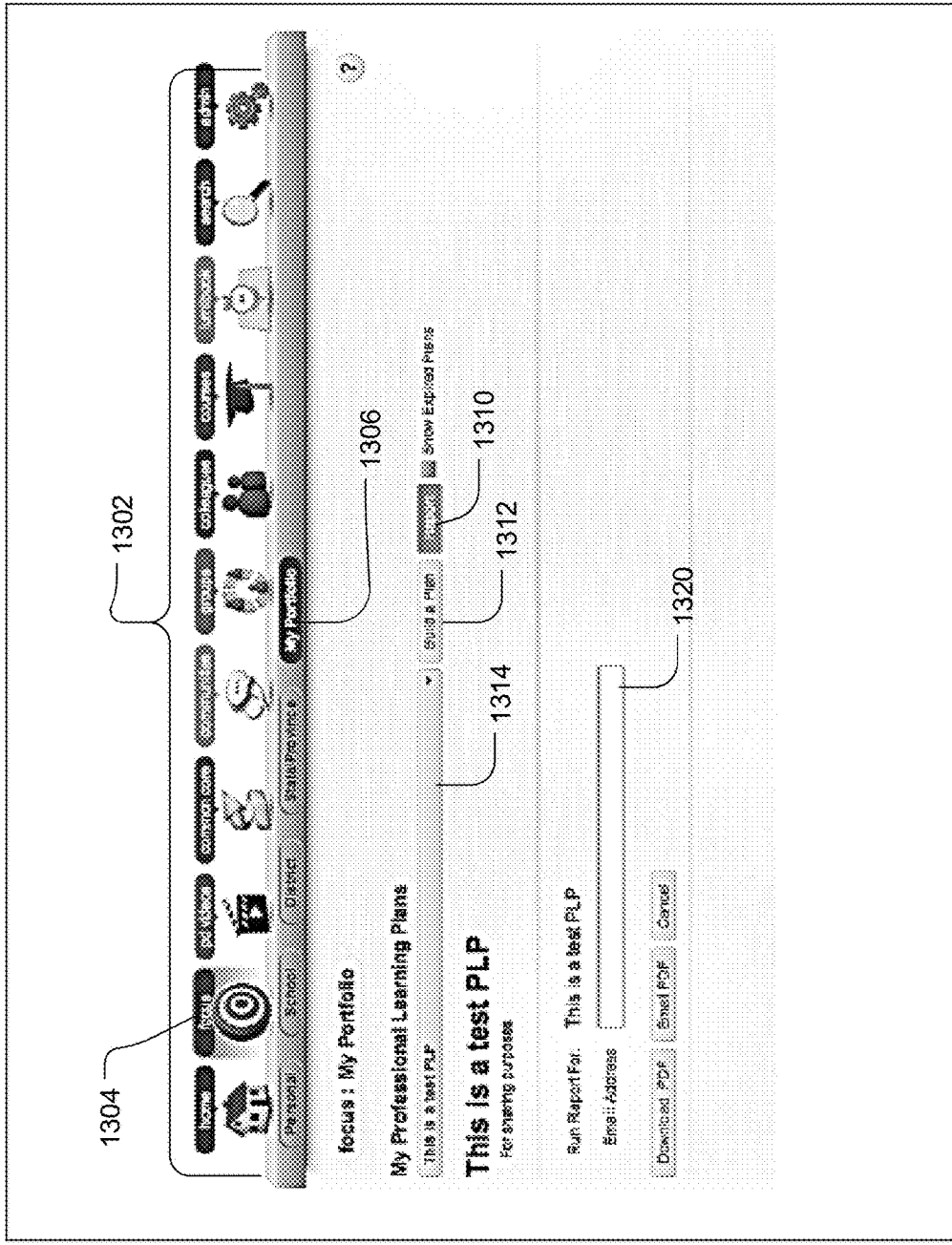
FIG. 22 is a representation of a web page, in a "My Portfolio" section of the professional development environment of FIG. 12, viewed in a web browser of a client computer of a teacher, by which the teacher may access a professional learning plan (called a "professional development plan" in connection with previous figures) assigned to the teacher and can cause generation and transmission of a report, in accordance with an embodiment of the present invention.

FIGS. 22-30 are a representation of a computer screen 1300 of a web page, in a "My Portfolio" section 1306 (of a submenu 1304) of the professional development environment (as shown by the navigation menu 1302) of FIG. 12, viewed in a web browser of a client computer of a teacher. As shown in FIG. 22, the teacher may access a professional learning plan 1314 (called a "professional development plan" in connection with previous figures) assigned to the teacher, or build a plan using button 1312, or generate a report using button 1310, in accordance with an embodiment of the present invention. In open field 1320, the teacher may enter the address of an administrator for receiving a copy of the teacher's plan, in which case the designated administrator is automatically established as a facilitator for the plan.

Figure 23:
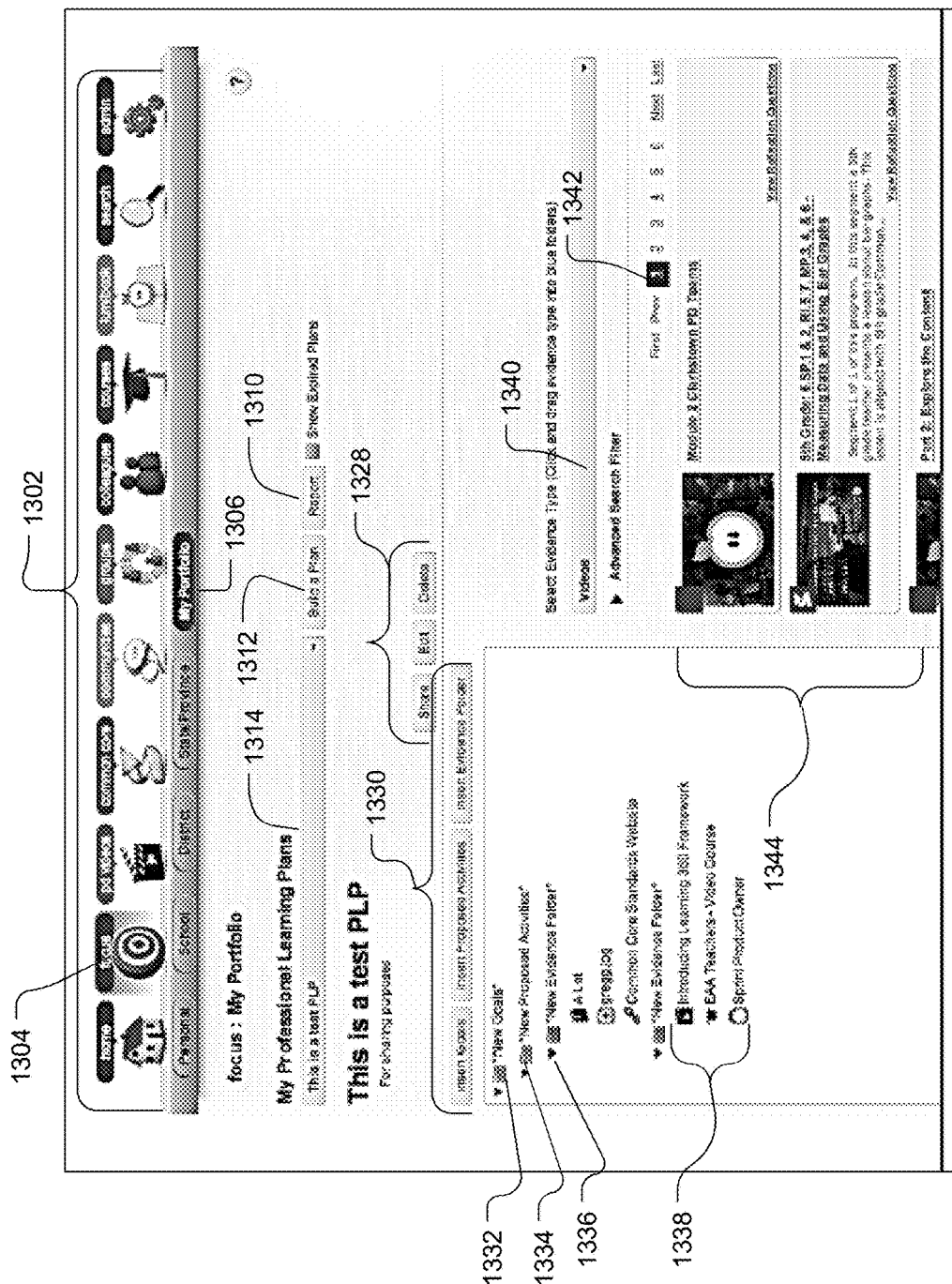
FIG. 23 is a representation of a web page, in the "My Portfolio" section of the professional development environment of FIG. 12, viewed in a web browser of a client computer of a teacher, displaying a teacher's portfolio of professional learning plans with access to video resources for use as evidence in accordance with an embodiment of the present invention.
Figure 24:
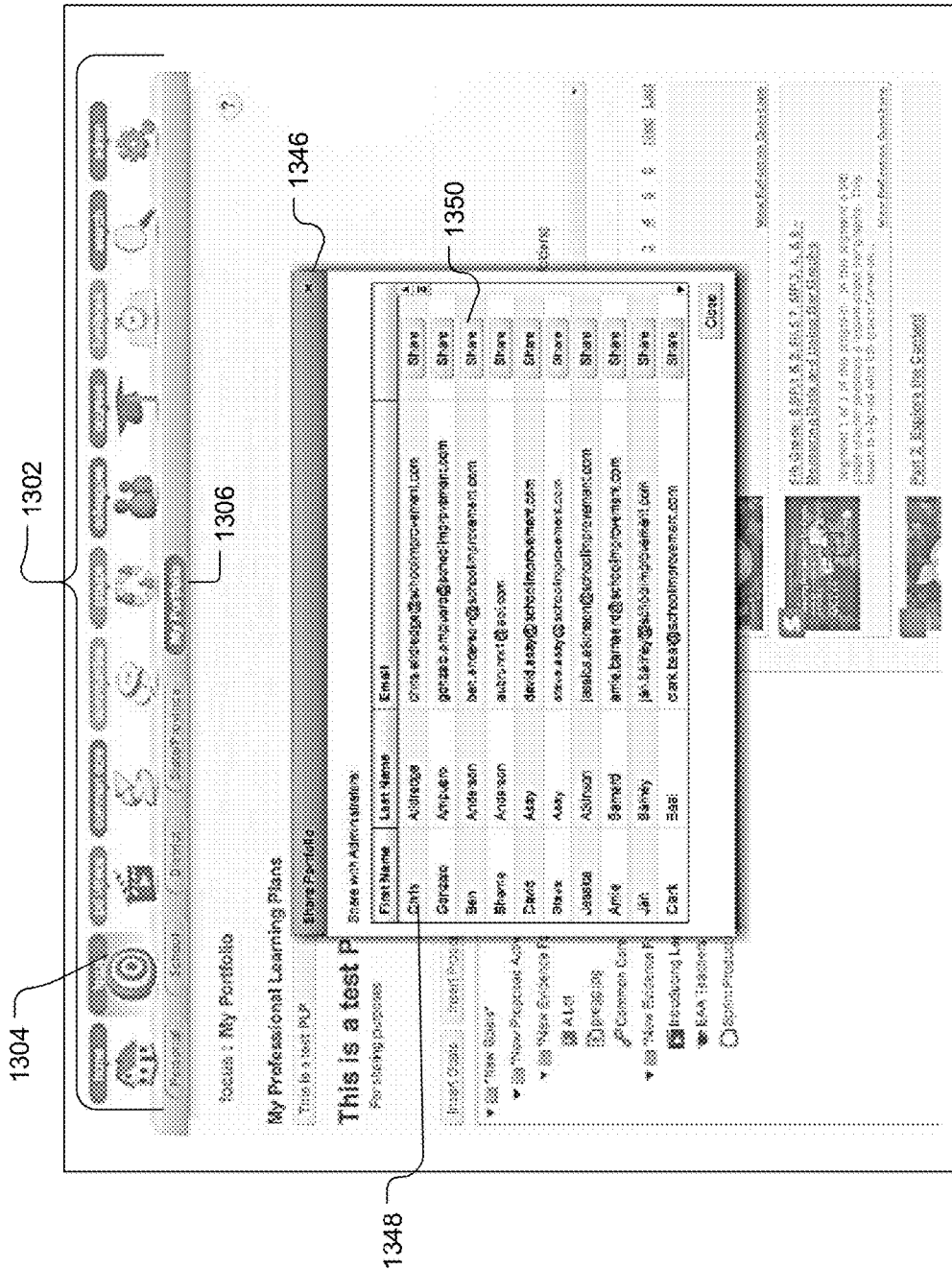
FIG. 24 is a representation of the web page of FIG. 23 displaying a pop-up window by which the teacher can select one or more administrators with whom to share the teacher's portfolio of professional learning plans, in accordance with an embodiment of the present invention.

In FIG. 23, the details of a selected plan are displayed. A numbers of tools 1330 are provided to structure the plan, which can include goals 1332, activities 1334 and evidence 1336 and 1338. In this case the evidence may be selected from a browsing feature 1340 which displays learning video resources 1334. As shown in FIG. 24, the teacher can select one or more administrators 1348 with whom to share 1350 the teacher's portfolio of professional learning plans from a pop-up window 1346.

Figure 25:
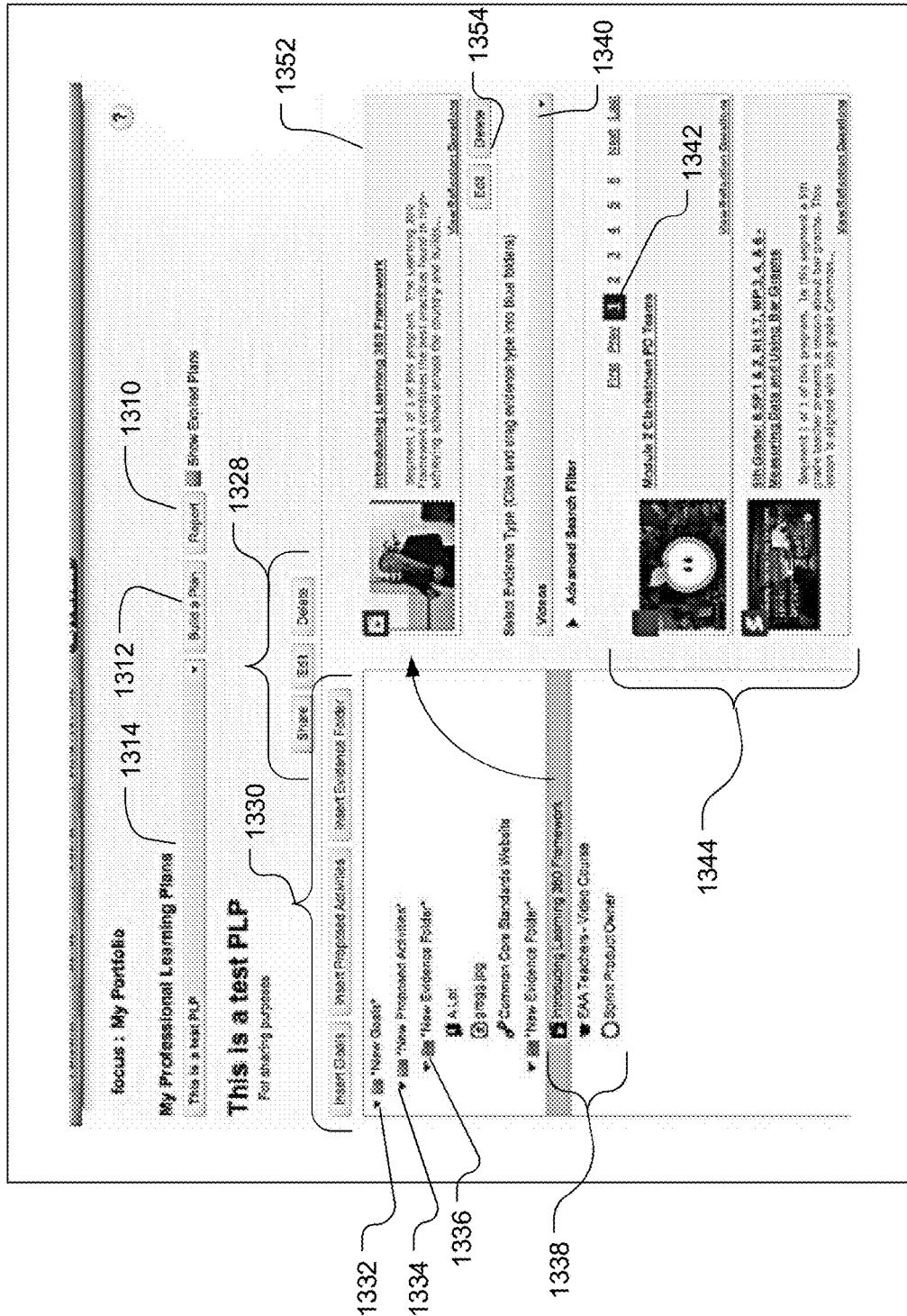
FIG. 25 is a representation of the web page of FIG. 23, wherein the user has selected a video in the evidence folder of a plan, and thus caused details of the video to be displayed as an element on the page, with options to view reflection questions, to edit text in the display associated with the video, and to delete the video, in accordance with an embodiment of the present invention.
Figure 26:
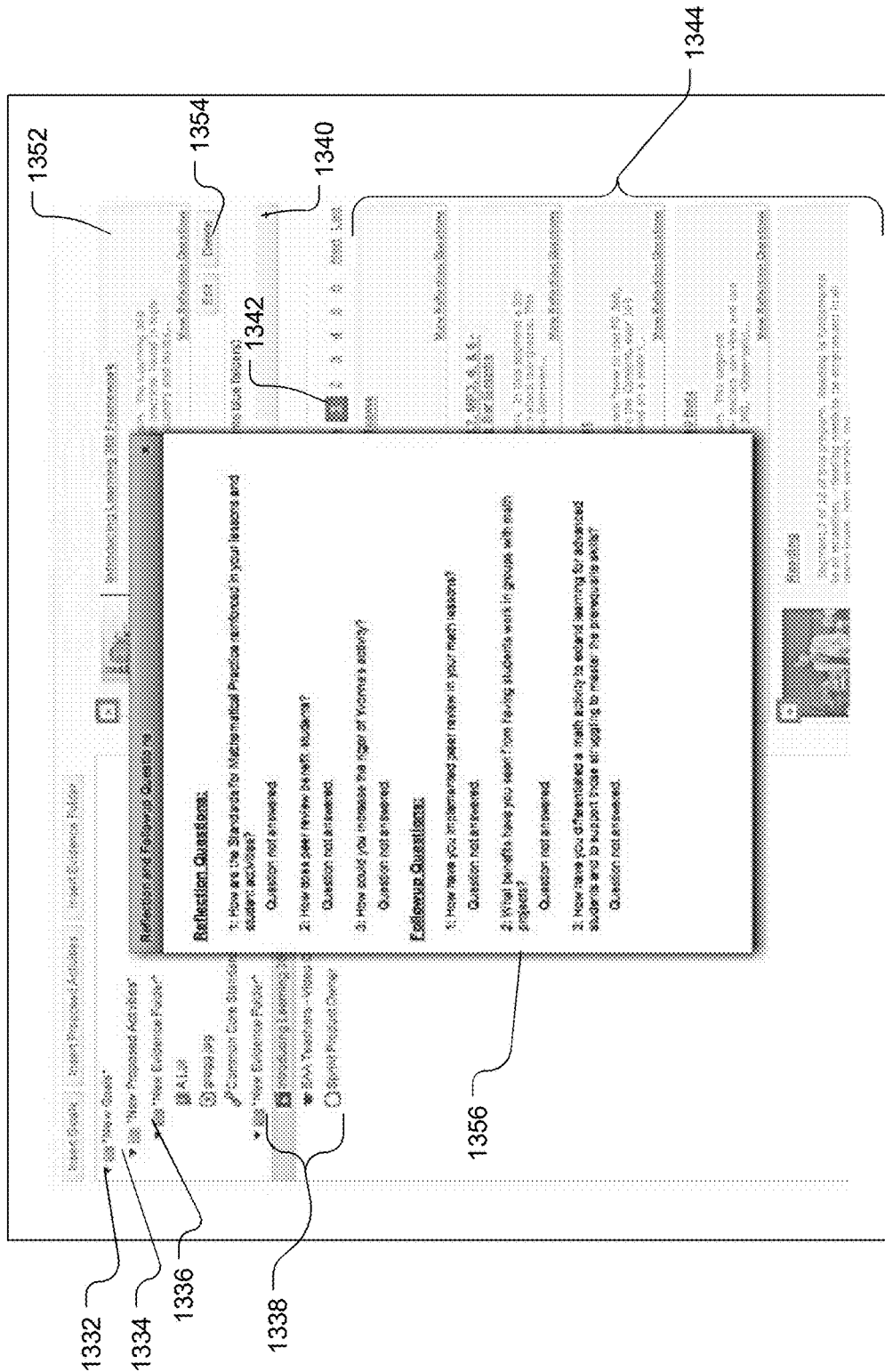
FIG. 26 is a representation of the web page of FIG. 23, wherein the user has selected the option to view reflection questions and there is shown a pop-up window providing the reflection questions and follow up questions, in accordance with an embodiment of the present invention.

As shown in FIG. 25, a teacher can select a video in the evidence folder 1336, 1338 of a plan, and thus cause details of the video 1352 to be displayed as an element on the page, with options to view (and answer) reflection questions (shown in FIG. 26 as a pop-up window 1356), to edit text in the display associated with the video 1354, and to delete the video 1354, in accordance with an embodiment of the present invention.

Figure 27:
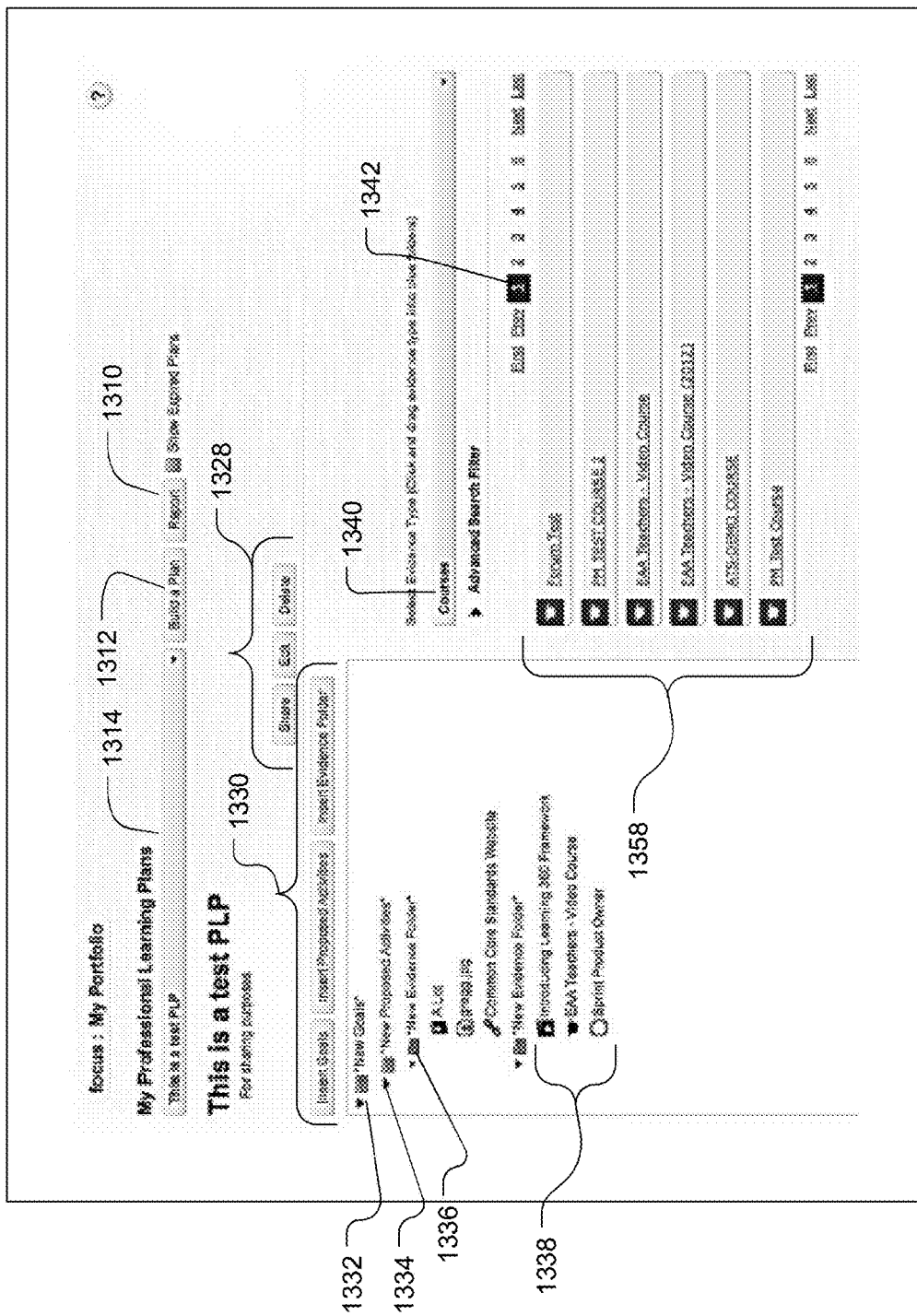
FIG. 27 is a representation of the web page of FIG. 23, wherein the user has selected a different evidence type, in this case courses, and the first page of a listing of such courses appears in a window on the page, with the first course listed being "Forum Test". in accordance with an embodiment of the present invention.
Figure 28:
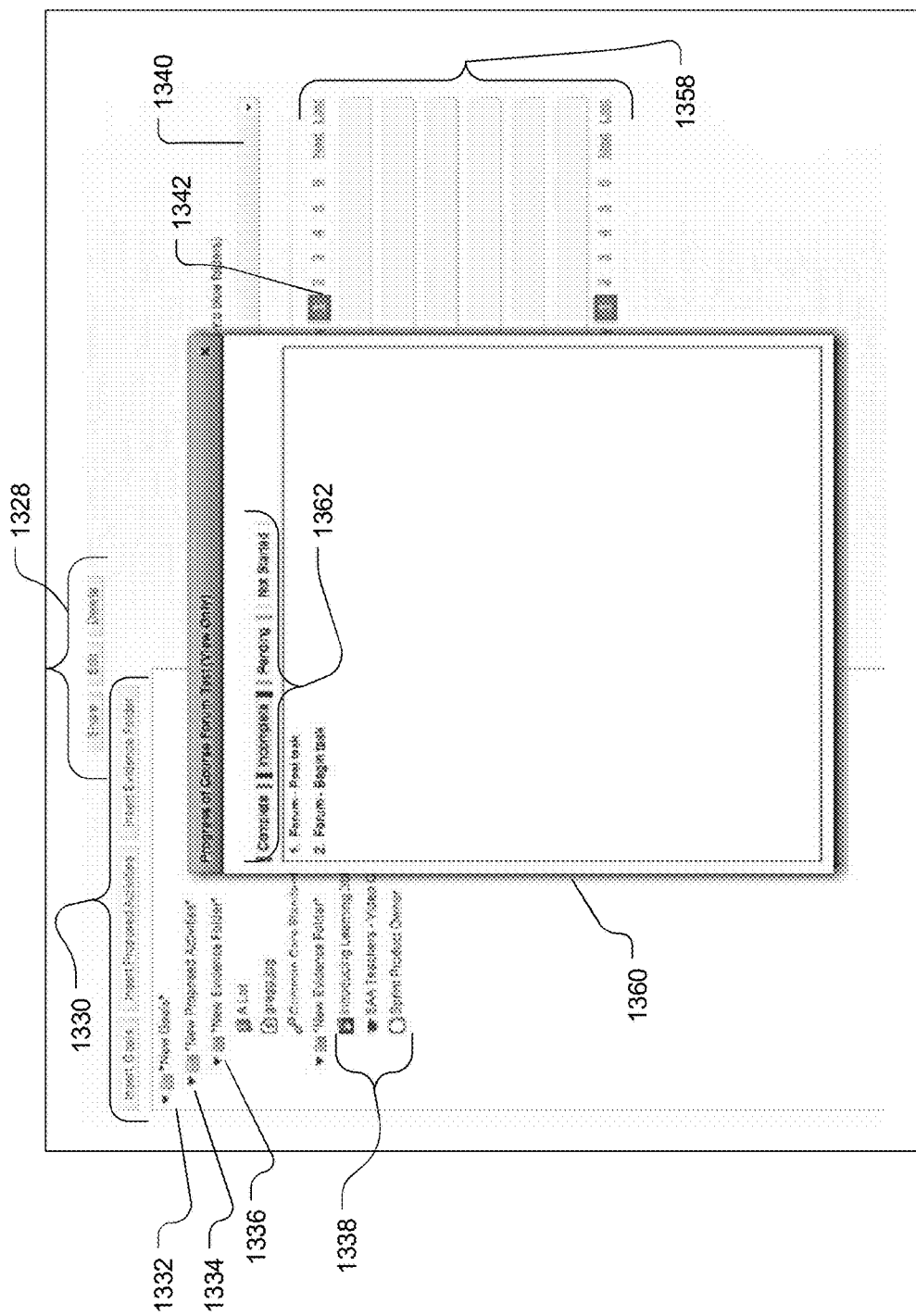
FIG. 28 is a representation of the web page of FIG. 23, wherein the user has selected the "Forum Test" of FIG. 27, and there appears a pop-up status window of the Forum Test by which the user can post the Forum Test as a task and can begin the task in accordance with an embodiment of the present invention.

As shown in FIG. 27, a teacher can also select a different evidence type, in this case courses 1340, 1358, and the first page 1342 of a listing of such courses appears in a window on the page, with the first course listed being "Forum Test" in accordance with an embodiment of the present invention. Details of the progress status 1362 of a teacher studying the course are displayed as a pop-up window 1360 on FIG. 28 for the selected course the "Forum Test." The teacher can post the Forum Test as a task and can begin the task.

Figure 29:
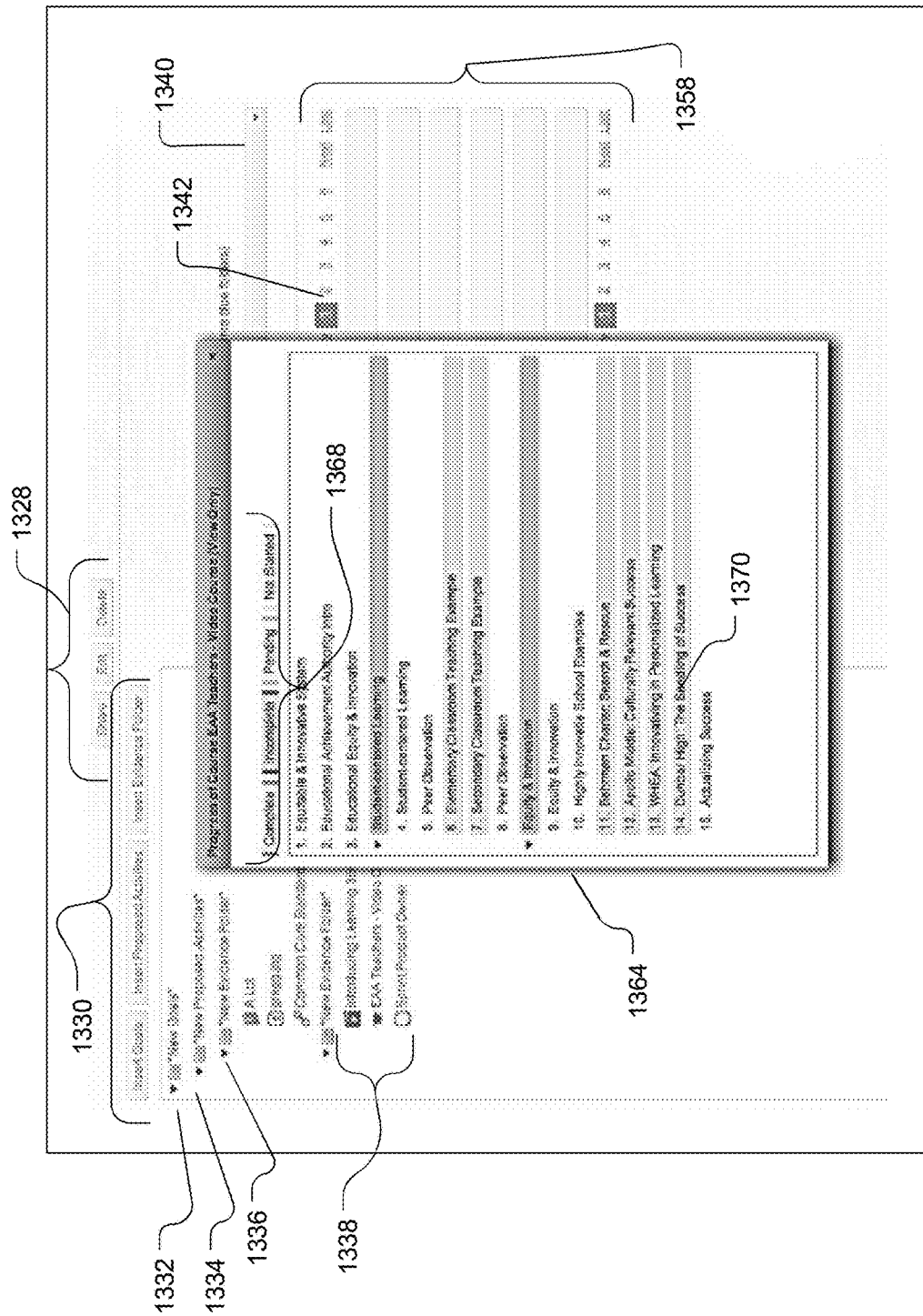
FIG. 29 is a representation of the web page of FIG. 23, wherein the user has selected EAA Teachers as the evidence and there appears a pop-up status window for this course, in accordance with an embodiment of the present invention.

As another example, FIG. 29 also shows the pop-up status window 1364 of another course "EAA Teachers" that the teacher has selected as the evidence, wherein the table of content 1370 color-codes the progress of the teacher in accordance with the status legend 1368.

Figure 30:
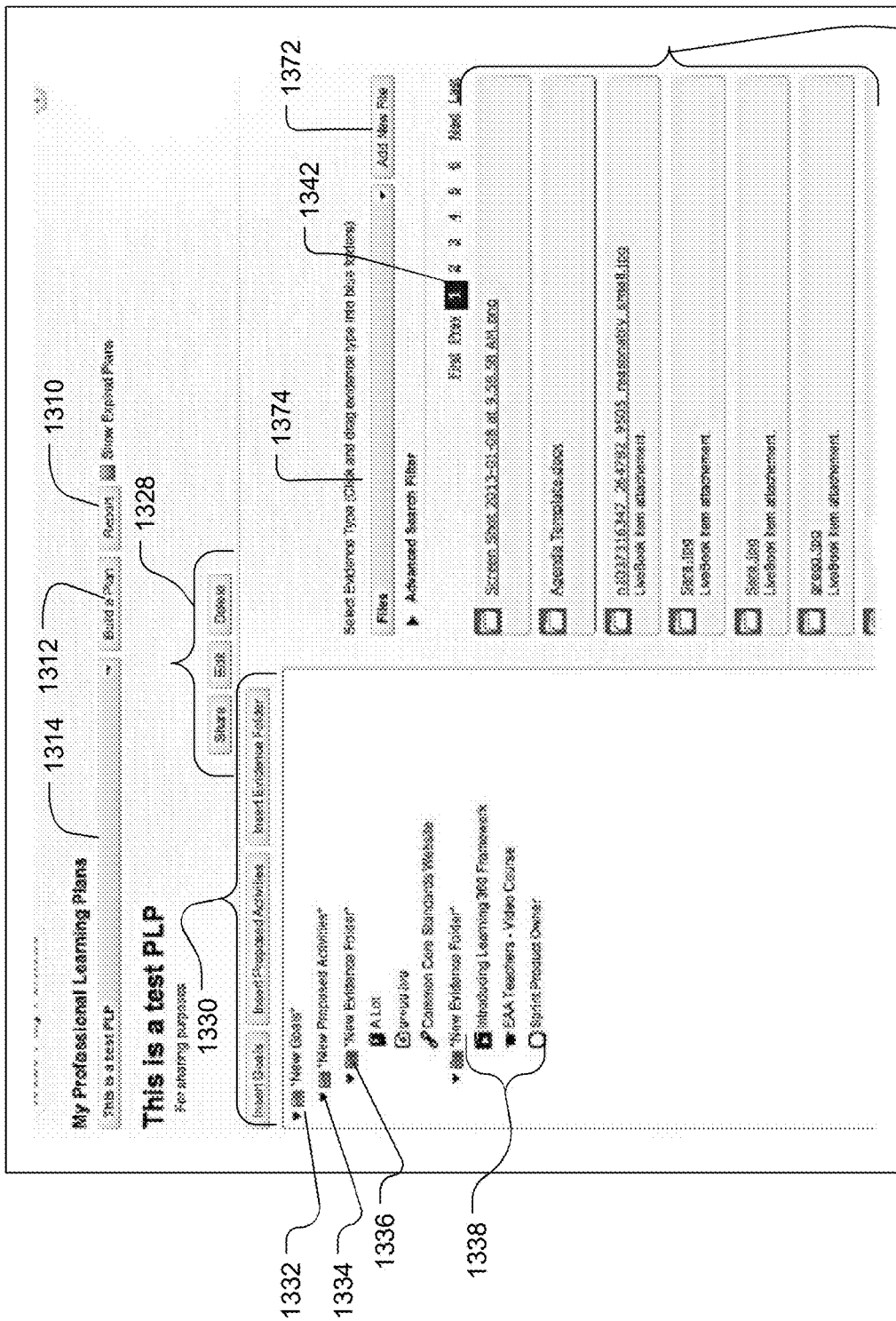
FIG. 30 is a representation of the web page of FIG. 23, wherein the user has selected a different evidence type, in this case files, and the first page of a listing of such files

As shown in FIG. 30, the teacher has also access to another different evidence type, in this case files 1376, and the first page 1342 of a listing of such files. These files are collections of evidence gathered by the teachers in the course of teaching students and may include work product of a student.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method comprising:
providing a novel computer environment, such environment establishing real-time integration of professional development activities with teacher observation processes for use by a specific teacher of a set of teachers of a school entity body, such environment having permissions gating access to observation data resulting from observation of the specific teacher being served in real time for display on a client computer of the specific teacher in a novel context with professional development data pertinent to performance of the specific teacher, such environment further integrating real-time observer and administrator participation;
providing each client computer of a plurality of client computers separately gated access to a platform associated with such environment over a network, wherein a load placed on the platform by the client computers is balanced by a load balancer coupled to a server system implemented by a series of application servers in a peer-to-peer configuration;
serving web pages, by the server system over the network to the client computer of the specific teacher, by which the specific teacher, in a professional view, views:
 (a) in a professional overview web page, at least one of processes or observation workflows, applicable to the specific teacher, defined by a selected administrator, in a set of administrators of the school entity body, using a client computer of the selected administrator, in communication with the server system; and
 (b) in an observation-specific web page, results of any selected one of a set of observations by a set of observers applicable to the specific teacher,
such observation results having been previously uploaded to the server system from an observer template on a client computer of each one of the set of observers who has observed the teacher, wherein the observer template includes areas designated for entry by each one of the set of observers for comments and for a suggested set of resources for the specific teacher that are pertinent to the comments, and the observation-specific web page having corresponding areas for the observer comments and the set of resources thus entered, such observation-specific web page further including a designated region wherein the specific teacher can provide a feedback comment to such results; and
providing, within the professional view a set of graphical links by which the specific teacher accesses and views a set of professional learning plan (PLP) web pages, each PLP web page defining a distinct professional learning plan for the specific teacher, such PLP web pages being individually selectable from a portfolio web page listing all of the PLP web pages for the specific teacher, and wherein each PLP web page includes a dedicated region whereby the specific teacher provides evidence for performance in accordance with the corresponding distinct professional learning plan;
wherein the permissions gating access to the specific teacher, the observers, and the administrators are stored in a user database with separately gated access by each of the specific teacher, the observers, and the administrators to computer resources on the network, and the observation results, the feedback comment by the specific teacher, and the evidence for performance are caused to be stored by the server system and made available by the server system in web pages over the network for viewing by at least one of the administrators, the environment therefore similarly integrating real-time participation of the observers and administrators.

2. A method according to claim 1, wherein the professional overview web page includes a graphical mechanism by which the specific teacher can enter completion data for each process item therein listed, the method further comprising:
receiving, over the network by the server system from the client computer of the specific teacher and from the client computers of the observers, completion data for processes defined and observation workflows defined with respect to which such the specific teacher and observers have played a role, and storing such completion data;
serving web pages, by the server system over the network to a client computer of the at least one administrator, by which the at least one administrator can view the completion data applicable to the specific teacher.

3. A method according to claim 2, wherein the web pages by which the at least one administrator can view the completion data include web pages displaying the status of steps in one or more defined processes.

4. A method according to claim 2, wherein the web pages by which the at least one administrator can view the completion data include web pages displaying the status of the defined observation workflows.

5. A method according to claim 2, further comprising:
serving web pages, by the server system over the network to client computers of the observers, by which each of the observers can view the completion data applicable to observation workflows defined for such observer.

6. A method according to claim 1, wherein the processes defined for the specific teacher are defined using a process template configured to receive a graphical user input from the selected administrator that specifies items including a name for a process to be defined, a name for each step in the process to be defined, and, for each such step, a designation of the type of step from a listing of types of steps.

7. A method according to claim 1, further comprising:
serving a set of web pages by the server system over the network to a client computer of a facilitator of a selected one of the professional learning plans applicable to the specific teacher, such web pages defining the selected professional learning plan applicable to the specific teacher and the evidence, so that the facilitator can see and review the evidence.

8. A method according to claim 7, wherein the web pages served to client computer of the facilitator are configured so that a web page applicable to the specific teacher shows the selected plan and the evidence in a manner as to show progress of the specific teacher in carrying out the selected plan.

9. A method according to claim 7, wherein the evidence includes reflection questions associated with videos referenced in the selected professional learning plan as well as answers posted in response to the reflection questions.

10. A method according to claim 7, wherein the PLP web pages served to the client computer of the specific teacher are configured so that the specific teacher can cause a given one of such teacher's professional learning plans to be shared with an administrator, the method further comprising, when the specific teacher has caused the sharing of the given plan with the administrator, automatically registering the administrator as the facilitator of the given plan.

11. A method according to claim 7, wherein (i) the web pages served to the client computer of the facilitator are configured so that the facilitator can make a comment with respect to a folder of the selected professional learning plan or an item of evidence that has been attached to the plan and such comment is transmitted to the server system over the network, the method further comprising storing such comment in association with the selected professional learning plan applicable to the specific teacher; and (ii) the web pages served to the client computer of the specific teacher are configured so that they show the comment after the comment has been stored by the server system.

12. A method according to claim 11, wherein the web pages served to the client computer of the specific teacher are further configured so that the specific teacher can provide a response to the comments, the response being transmitted to the server system and stored by the server system, and wherein the web pages served to the client computer of the facilitator are configured so that the facilitator can see the response after it has been stored by the server system.

13. A method according to claim 1, wherein providing each client computer separately gated access to a platform associated with such environment over a network includes offloading part of the server system load to a series of search servers and a reporting server for report generation, which in turn accesses a reporting data warehouse, and further the server system is coupled to a licensing engine which determines resources that are available to any specific user accessing the platform from each client computer one of the plurality of client computers.

\* \* \* \* \*